(12) United States Patent
Hwang et al.

(10) Patent No.: US 10,261,638 B2
(45) Date of Patent: Apr. 16, 2019

(54) TOUCH SENSOR AND METHOD FOR MANUFACTURING SAME

(71) Applicant: LG CHEM, LTD., Seoul (KR)

(72) Inventors: Ji Young Hwang, Daejeon (KR); Donghyun Lee, Daejeon (KR); Seung Heon Lee, Daejeon (KR); Han Min Seo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 70 days.

(21) Appl. No.: 15/039,732

(22) PCT Filed: Dec. 15, 2014

(86) PCT No.: PCT/KR2014/012362
§ 371 (c)(1),
(2) Date: May 26, 2016

(87) PCT Pub. No.: WO2015/088295
PCT Pub. Date: Jun. 18, 2015

(65) Prior Publication Data
US 2016/0364043 A1   Dec. 15, 2016

(30) Foreign Application Priority Data
Dec. 13, 2013   (KR) .................. 10-2013-0155800

(51) Int. Cl.
*G06F 3/044*   (2006.01)
*G06F 3/041*   (2006.01)

(52) U.S. Cl.
CPC .............. *G06F 3/044* (2013.01); *G06F 3/041* (2013.01); *G06F 2203/04103* (2013.01); *G06F 2203/04107* (2013.01); *G06F 2203/04112* (2013.01)

(58) Field of Classification Search
CPC ........ G06F 3/041; G06F 3/0412; G06F 3/044; G06F 3/045; G06F 3/046; G06F 3/047; G06F 2203/04103; G06F 2203/04107; G06F 2203/04112
USPC .......... 345/173–174; 178/18.01, 18.05, 18.06
See application file for complete search history.

(56) References Cited

U.S. PATENT DOCUMENTS

| | | | |
|---|---|---|---|
| 9,295,176 B2* | 3/2016 | Ohtani | G06F 3/041 |
| 9,345,130 B2* | 5/2016 | Hwang | G06F 3/047 |
| 9,395,855 B2* | 7/2016 | Nakamura | G06F 3/044 |
| 9,645,694 B2* | 5/2017 | Iwami | G06F 3/041 |
| 2009/0218310 A1* | 9/2009 | Zu | B82Y 10/00 216/11 |
| 2010/0123670 A1 | 5/2010 | Philipp | |

(Continued)

FOREIGN PATENT DOCUMENTS

| | | |
|---|---|---|
| JP | 2010-277392 A | 12/2010 |
| JP | 2010-286886 A | 12/2010 |

(Continued)

*Primary Examiner* — Jason M Mandeville
(74) *Attorney, Agent, or Firm* — Dentons US LLP

(57) ABSTRACT

The present application relates to a touch sensor and a method for preparing the same, and the touch sensor according to the present application includes: a substrate; and a driving electrode part, a sensing electrode part, and a wiring electrode part, which are provided on the same surface of the substrate, in which the driving electrode part, the sensing electrode part, and the wiring electrode part each include a conductive pattern including a shielding part and an opening.

11 Claims, 23 Drawing Sheets

(56) References Cited

U.S. PATENT DOCUMENTS

| | | |
|---|---|---|
| 2010/0302204 A1 | 12/2010 | Miyayama et al. |
| 2011/0157079 A1 | 6/2011 | Wu et al. |
| 2012/0031746 A1* | 2/2012 | Hwang .................. G06F 3/041 |
| | | 200/5 A |
| 2012/0256642 A1 | 10/2012 | Badaye et al. |
| 2012/0327027 A1 | 12/2012 | Chang et al. |
| 2013/0100054 A1 | 4/2013 | Phillip |
| 2013/0127775 A1 | 5/2013 | Yilmaz et al. |
| 2013/0169558 A1 | 7/2013 | Min |
| 2013/0242485 A1 | 9/2013 | Ohtani et al. |
| 2014/0016047 A1 | 1/2014 | Hwang et al. |
| 2014/0041999 A1* | 2/2014 | Yim ........................ H01H 1/06 |
| | | 200/275 |
| 2014/0151098 A1 | 6/2014 | Hwang et al. |
| 2014/0168543 A1 | 6/2014 | Hwang et al. |
| 2015/0242013 A1* | 8/2015 | Ono ........................ G06F 3/044 |
| | | 345/174 |
| 2015/0342034 A1* | 11/2015 | Iwami .................. H05K 1/0274 |
| | | 345/174 |
| 2018/0164916 A1* | 6/2018 | Seo ........................ G06F 3/044 |
| 2018/0164917 A1* | 6/2018 | Seo ........................ G06F 3/041 |

FOREIGN PATENT DOCUMENTS

| | | |
|---|---|---|
| JP | 2011-138515 A | 7/2011 |
| JP | 2012-508937 A | 4/2012 |
| JP | 2012-103761 A | 5/2012 |
| KR | 10-2011-0127429 A | 11/2011 |
| KR | 10-2013-0005093 A | 1/2013 |
| KR | 10-2013-0033992 A | 4/2013 |
| KR | 10-2013-0033994 A | 4/2013 |
| WO | 2012-134715 A2 | 10/2012 |
| WO | 2013-048136 A2 | 4/2013 |

\* cited by examiner

[Figure 1] - RELATED ART
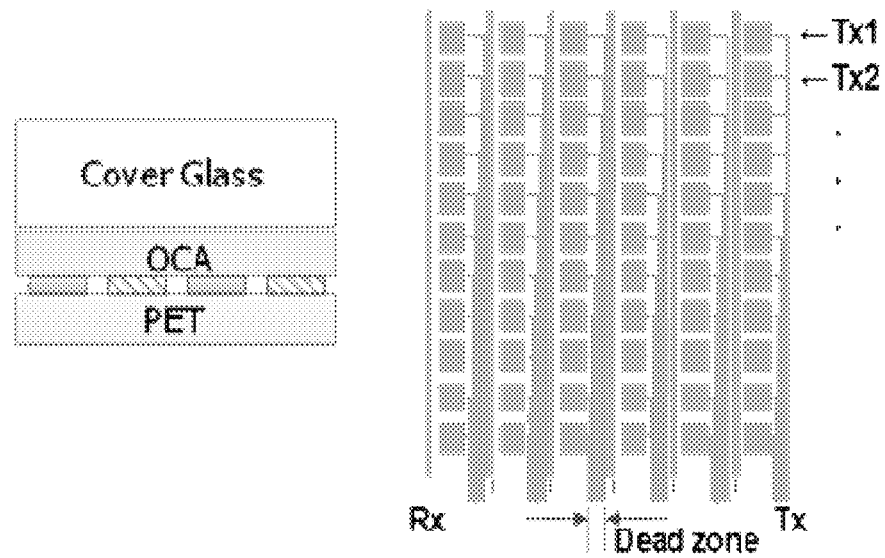
[Figure 2] - RELATED ART
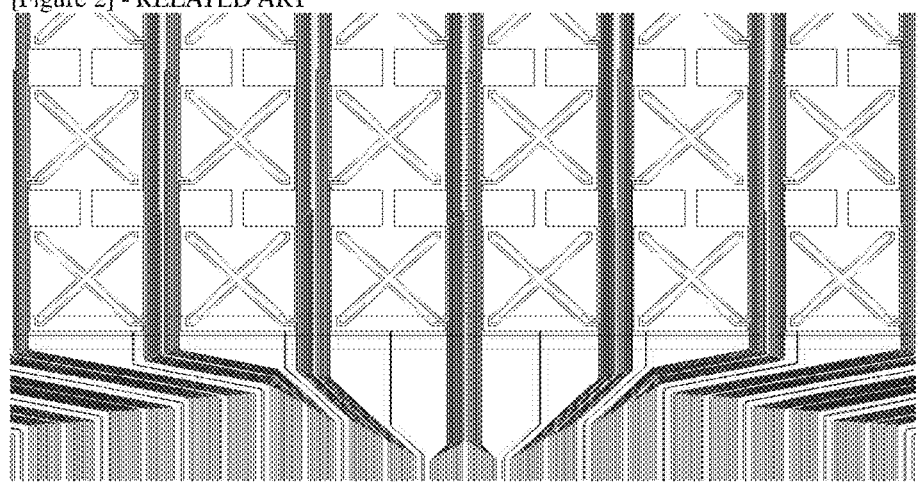

[Figure 3] - RELATED ART
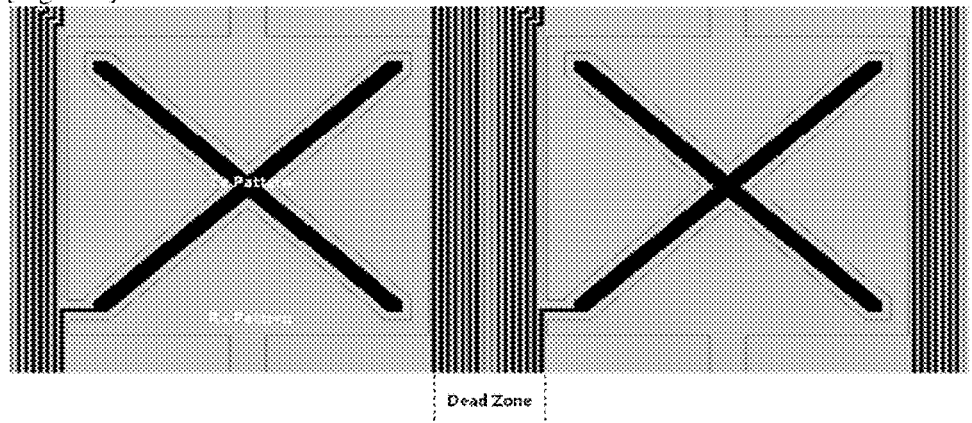
[Figure 4] - RELATED ART
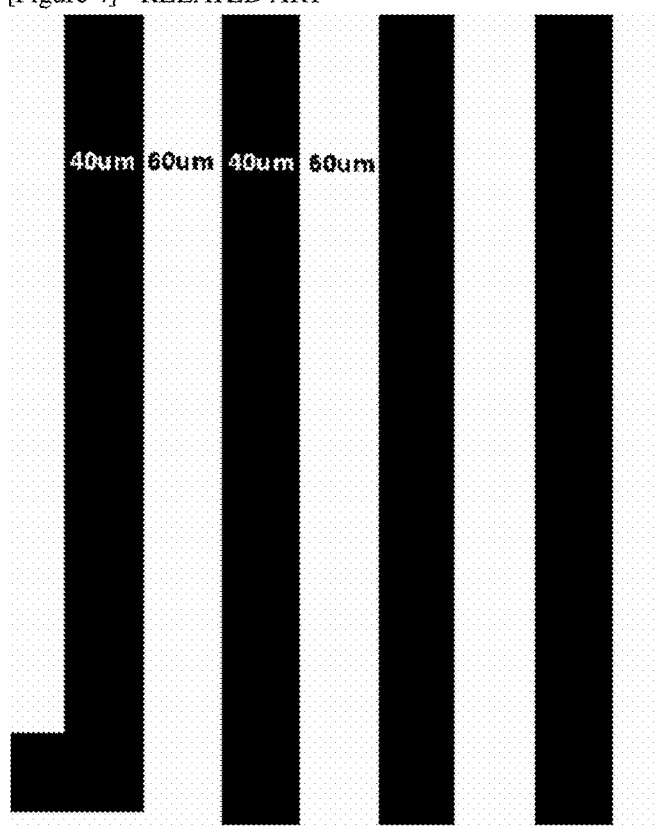

[Figure 5]
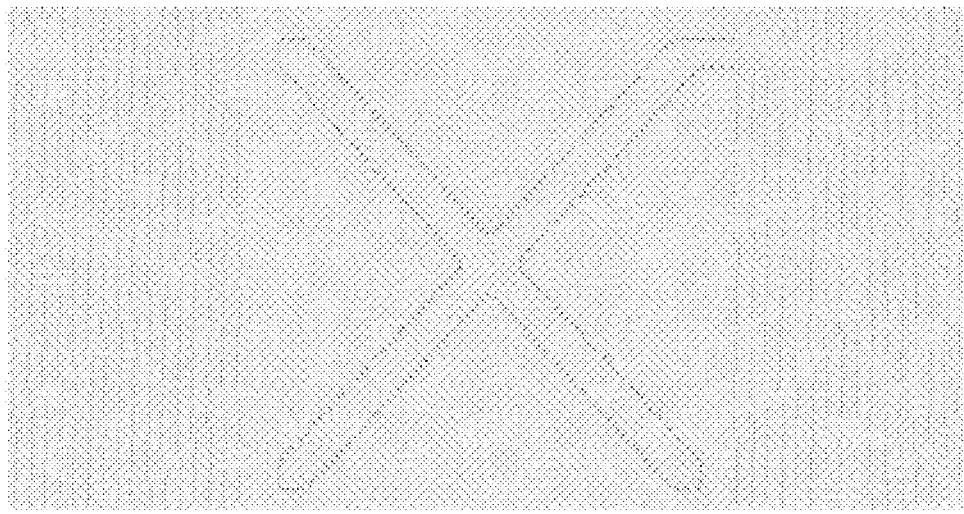

[Figure 6]
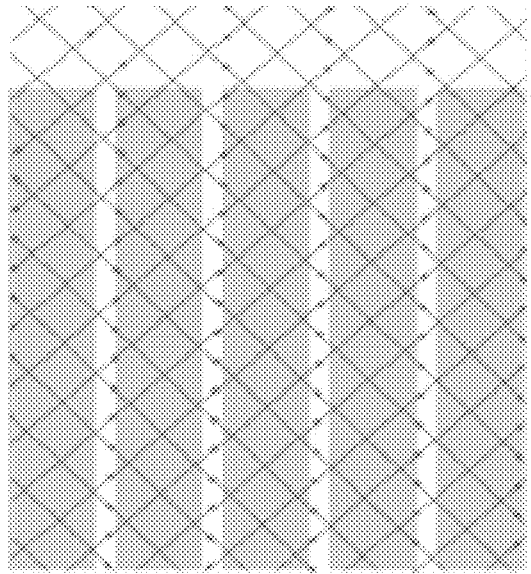
[Figure 7]
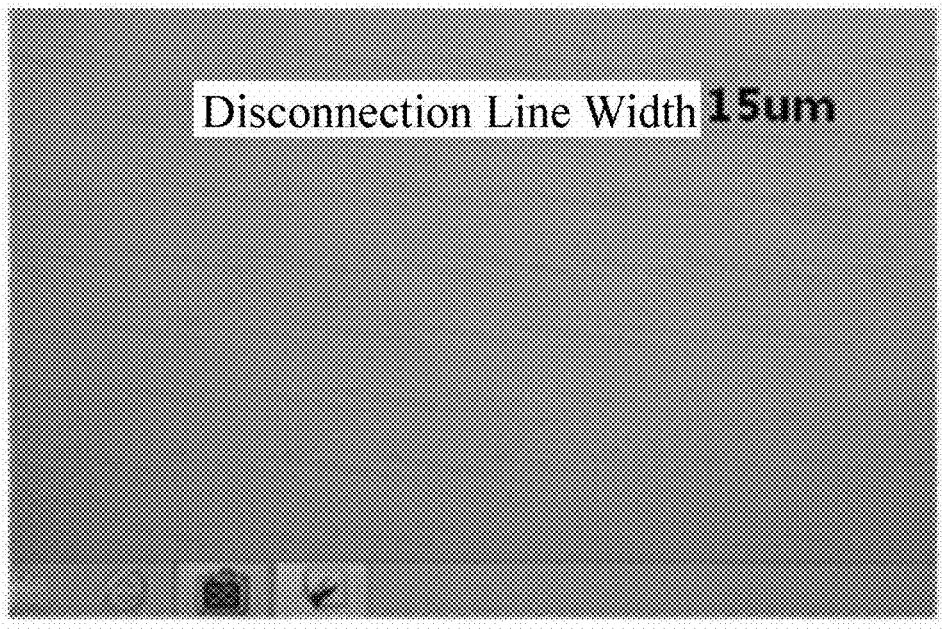

[Figure 8]
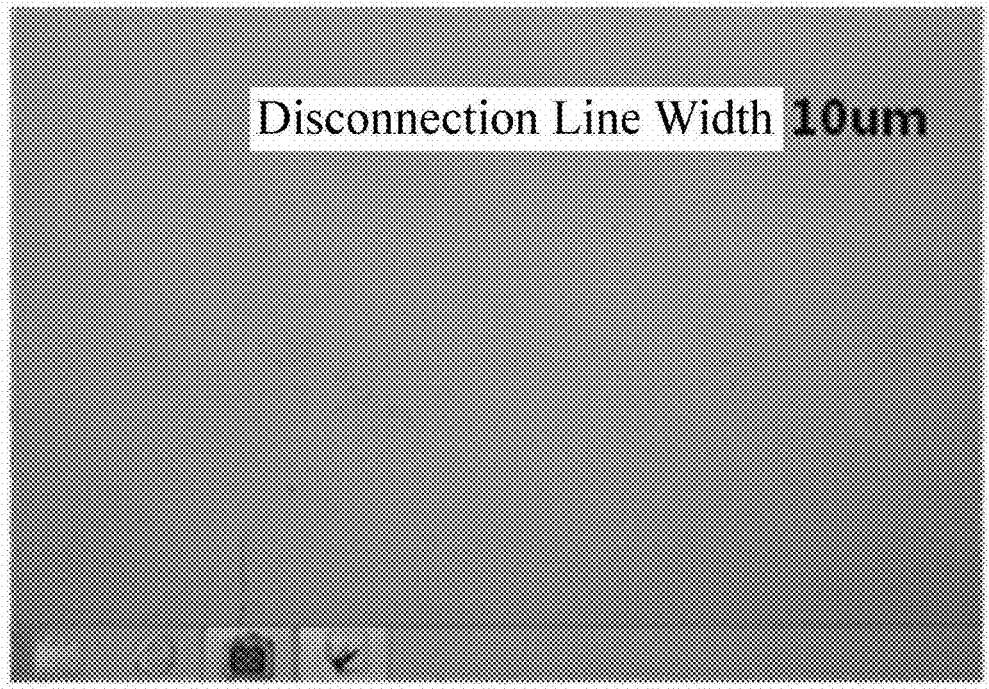
[Figure 9]
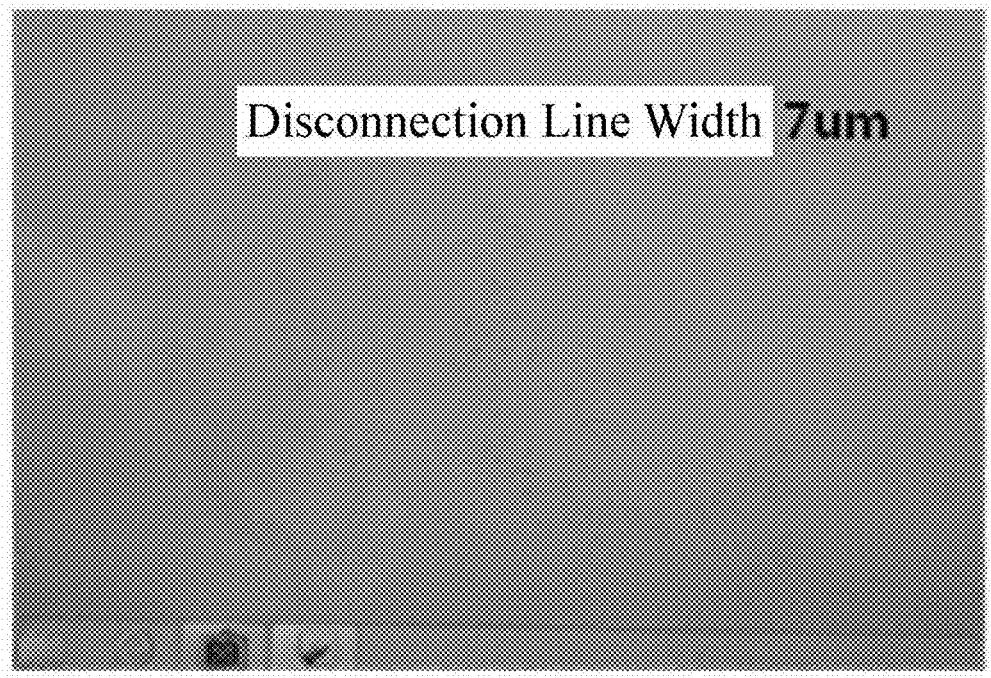

[Figure 10]
<SHAPE>
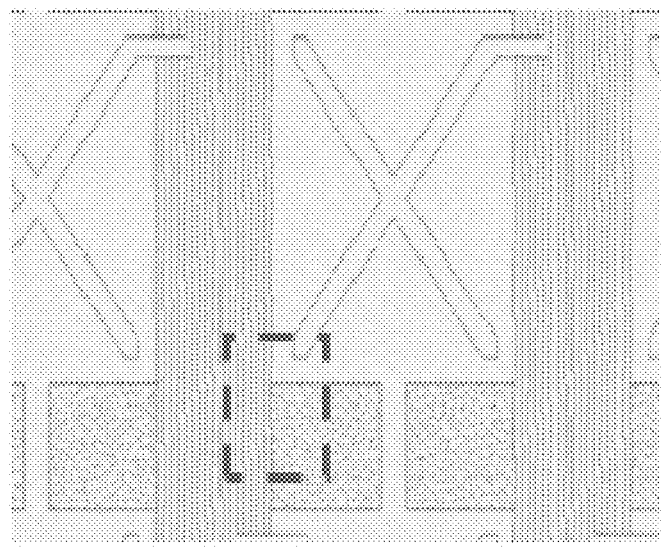
<DETAILED SHAPE>
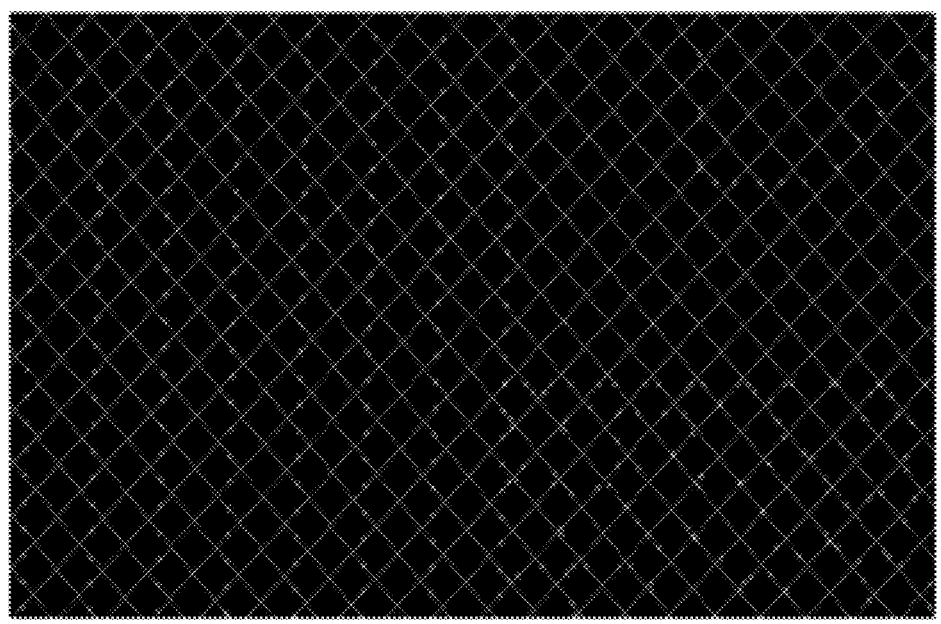

[Figure 11]
<SHAPE>
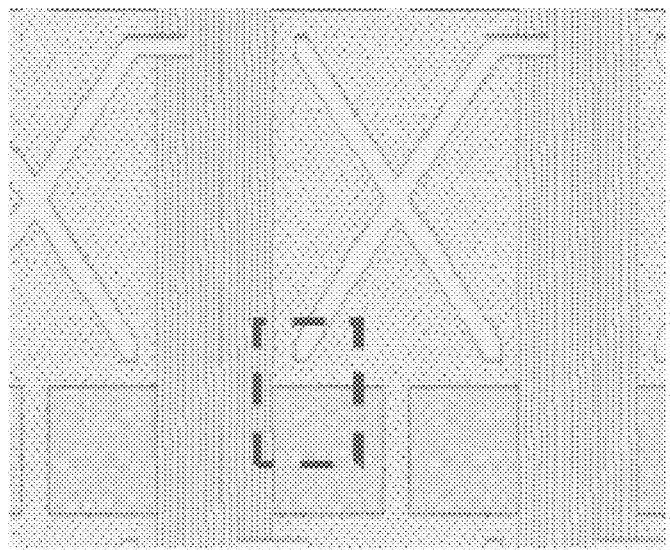
<DETAILED SHAPE>
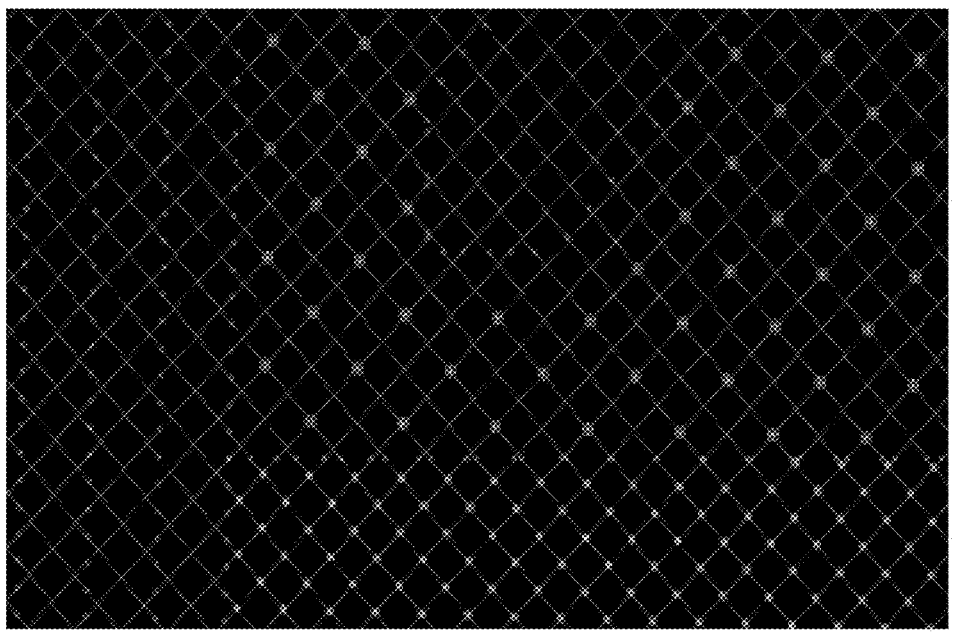

[Figure 12]
<SHAPE>
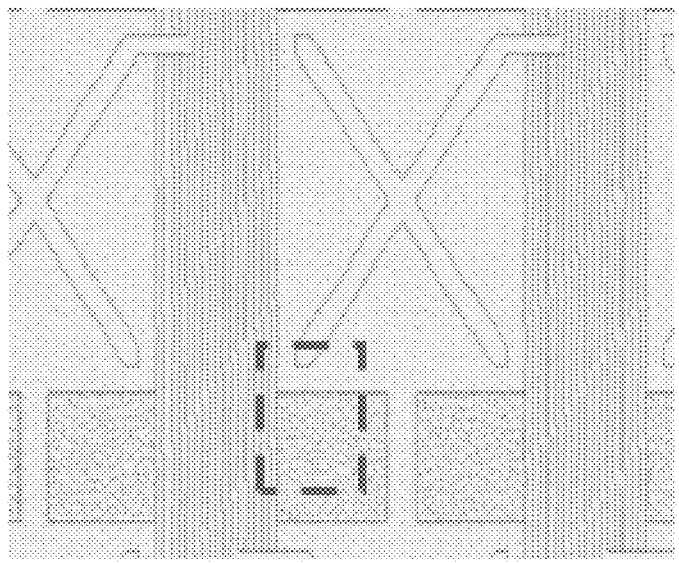
<DETAILED SHAPE>
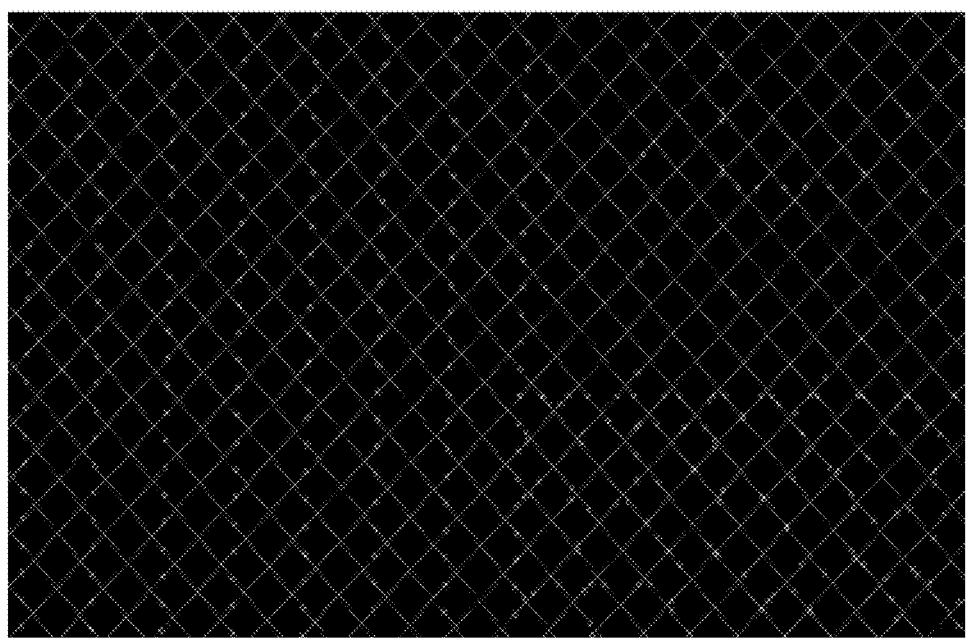

[Figure 13]
\<SHAPE\>
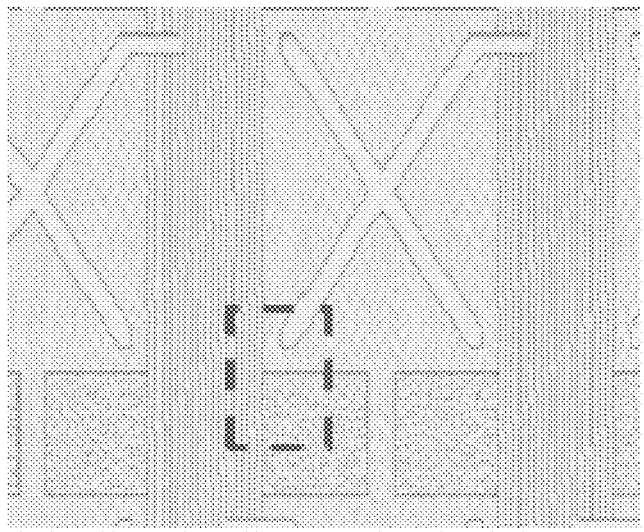
\<DETAILED SHAPE\>
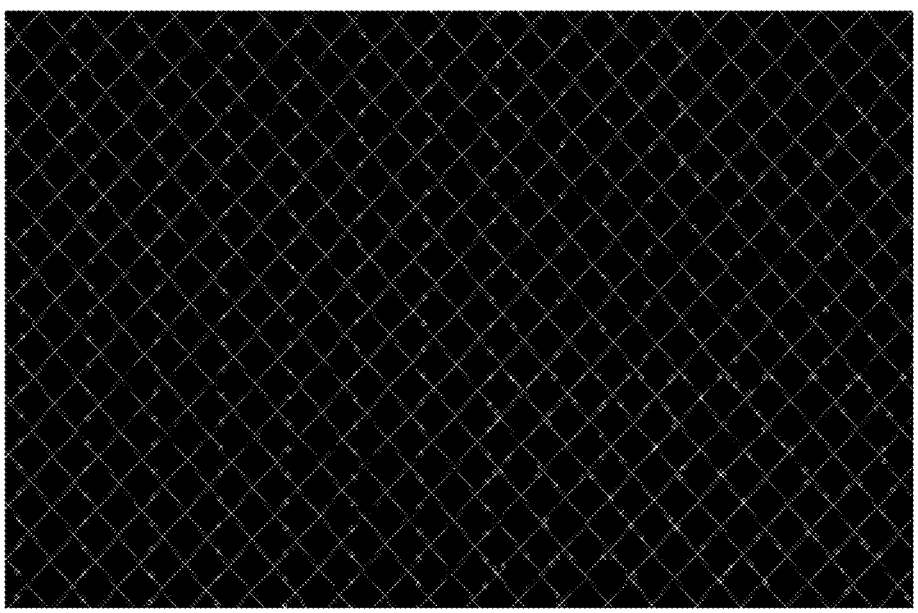

[Figure 14]
<SHAPE>
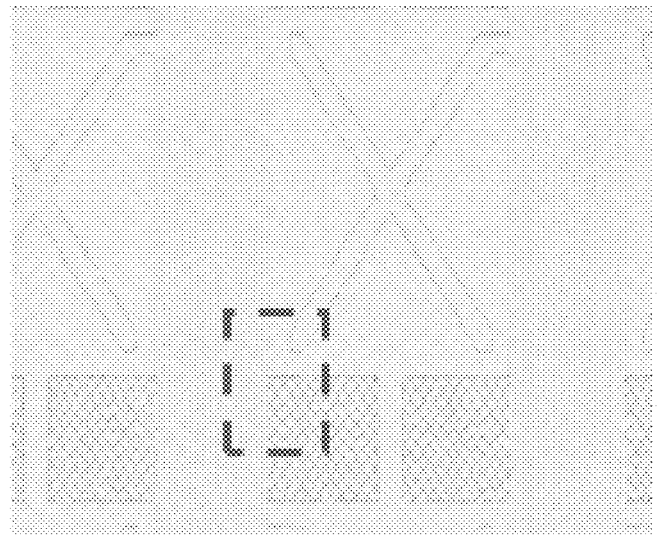
<DETAILED SHAPE>
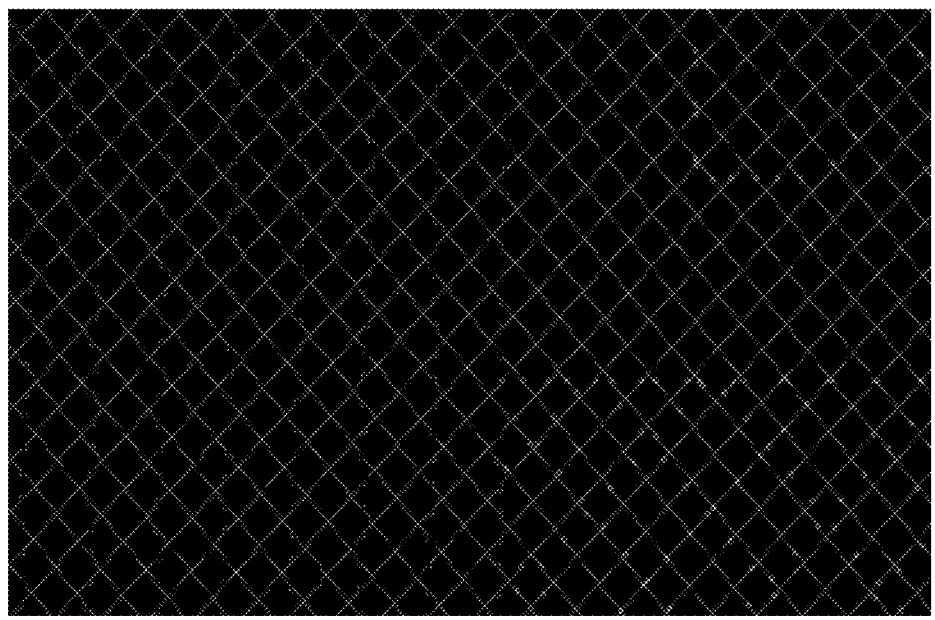

[Figure 15]
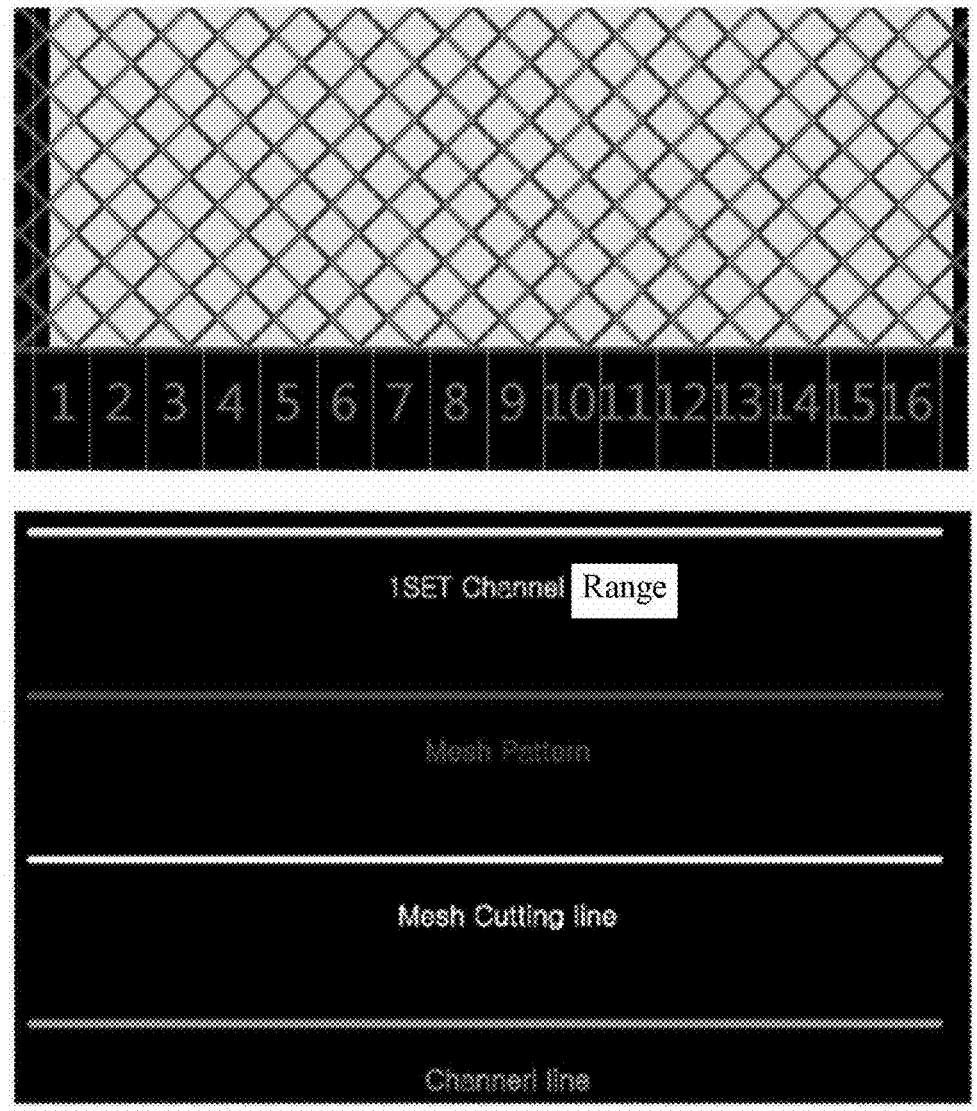

[Figure 16]
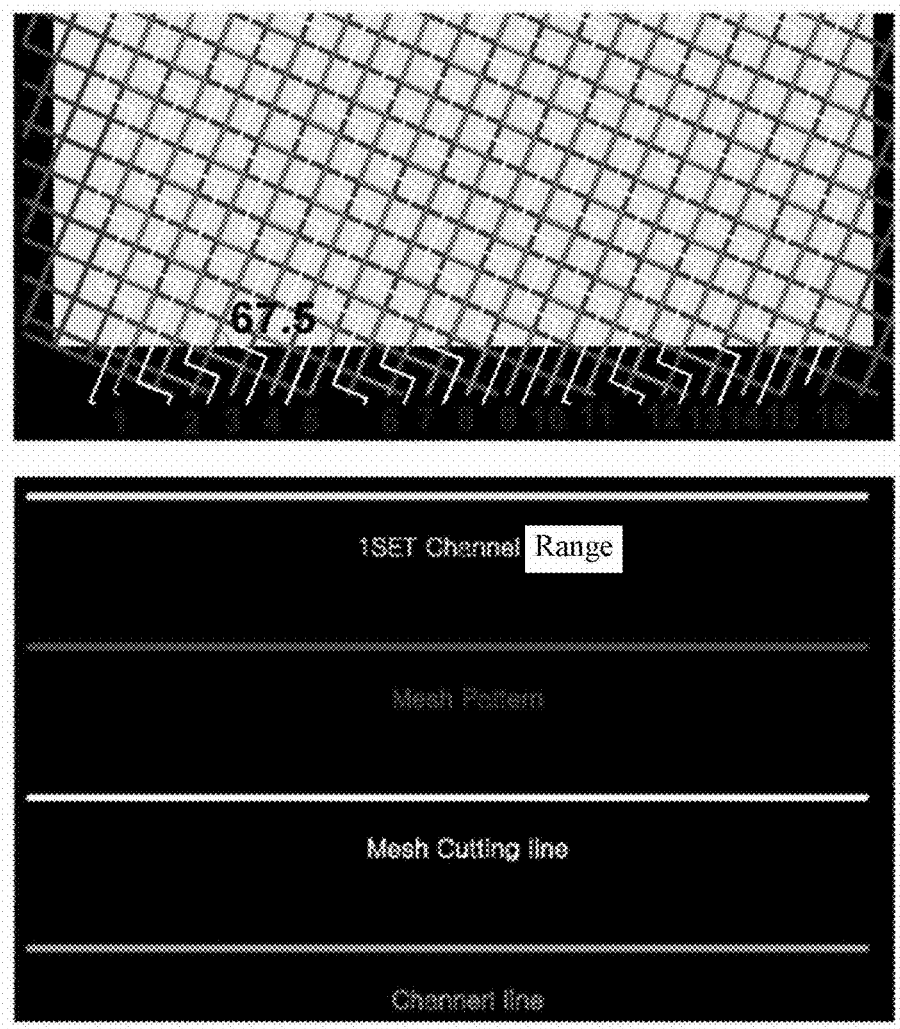

[Figure 17]
<SHAPE>
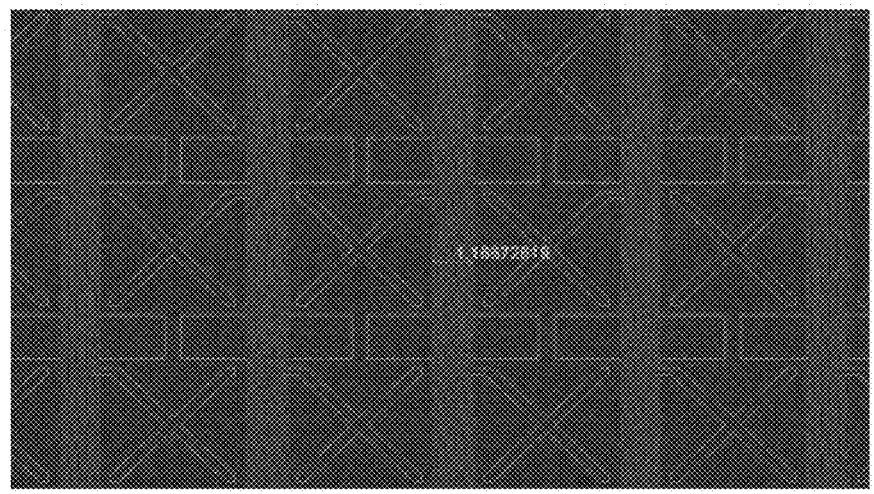
<DETAILED SHAPE>
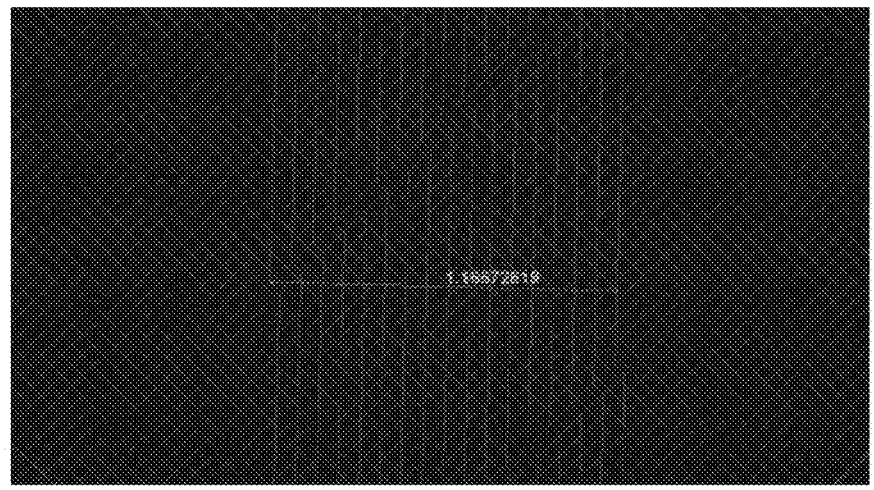

[Figure 18]
<SHAPE>
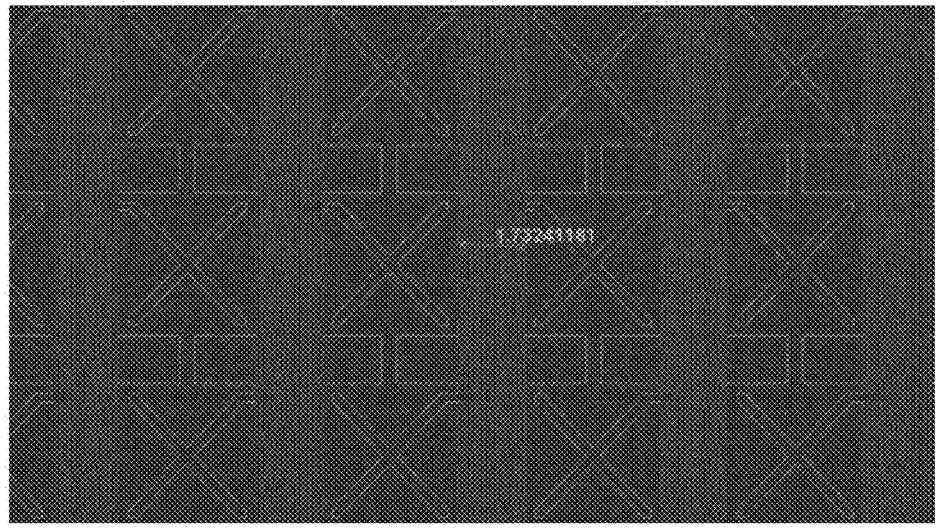
<DETAILED SHAPE>

[Figure 19]
<SHAPE>
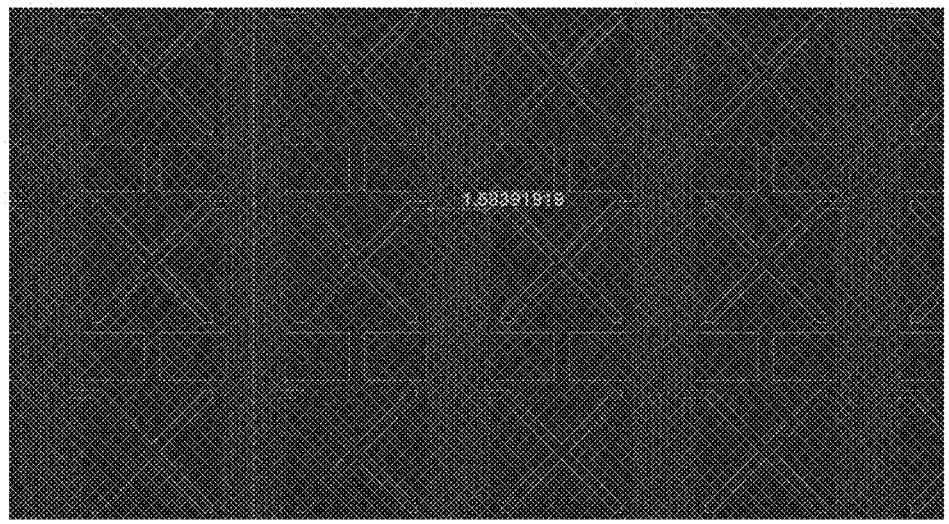
<DETAILED SHAPE>
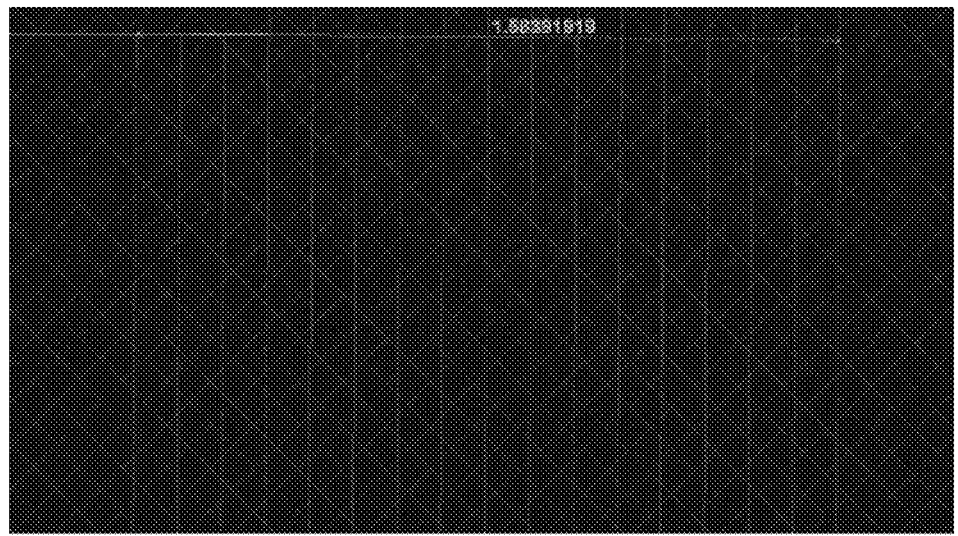

[Figure 20]
<SHAPE>
<DETAILED SHAPE>
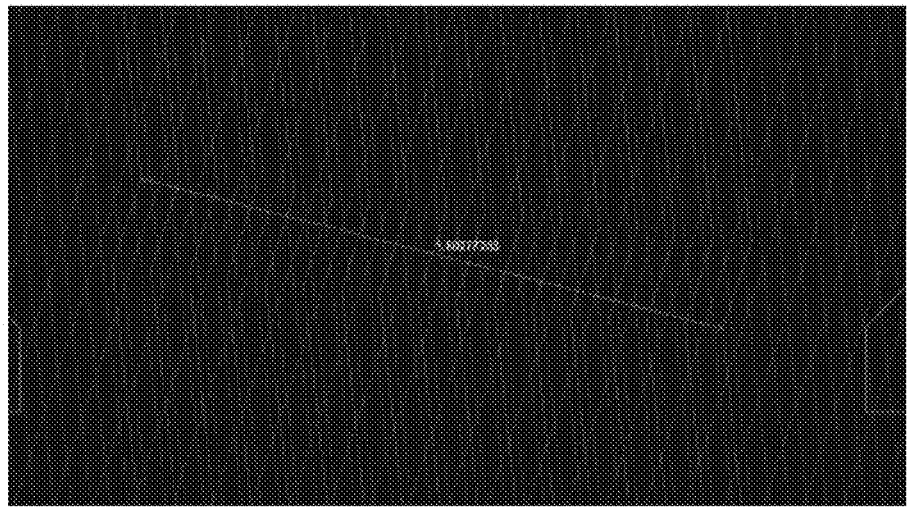

[Figure 21]
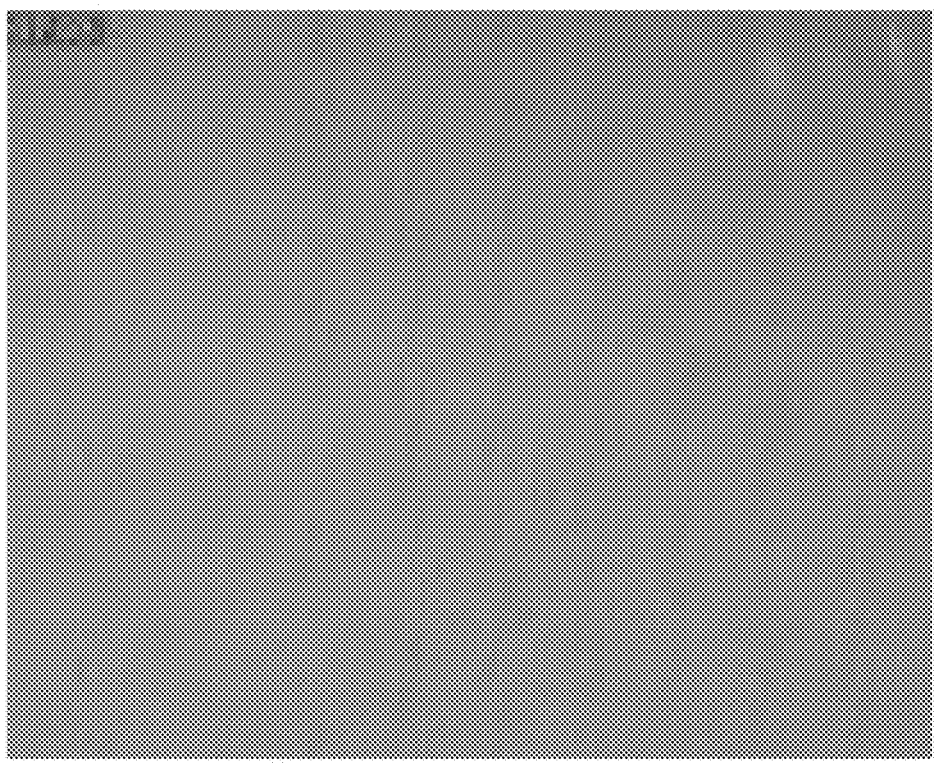

[Figure 22]
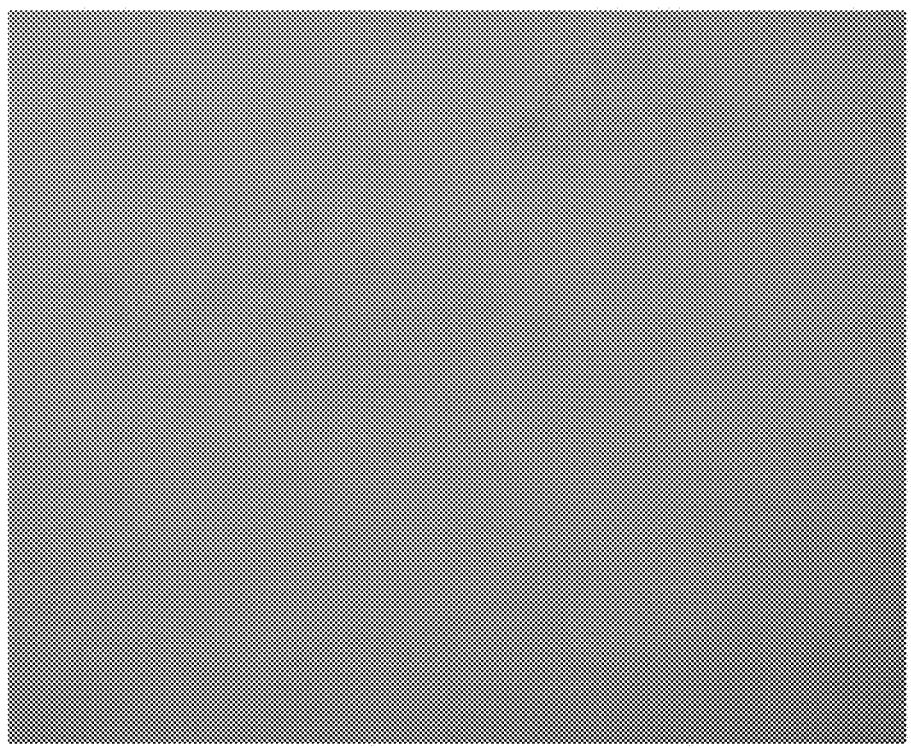

[Figure 23]
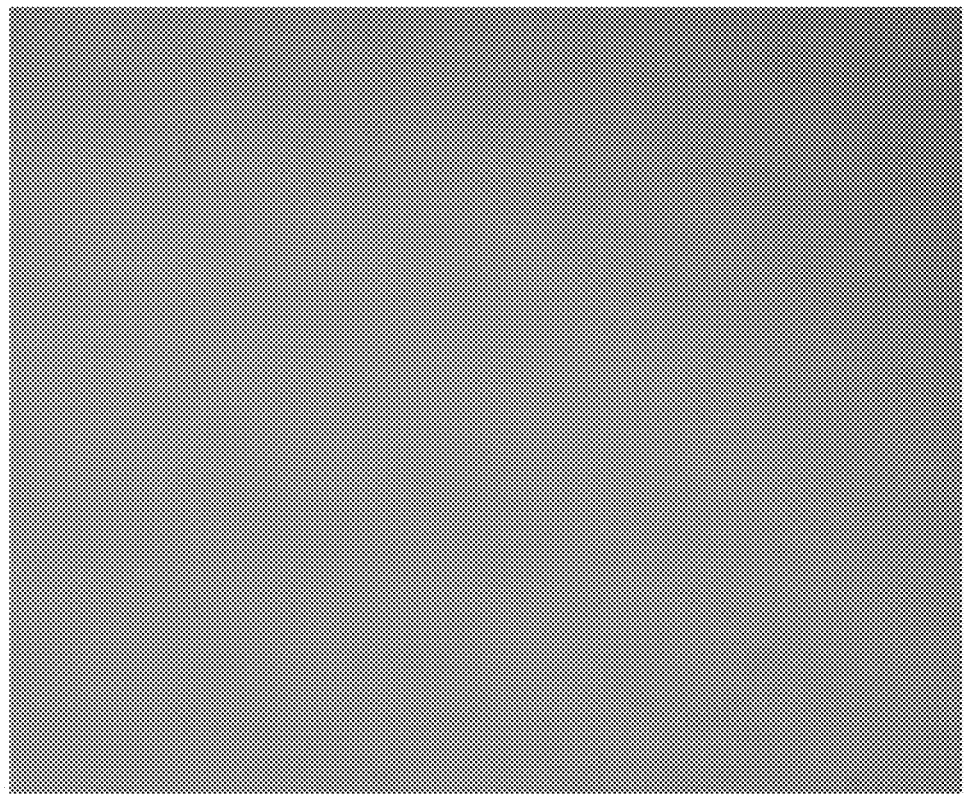

[Figure 24]
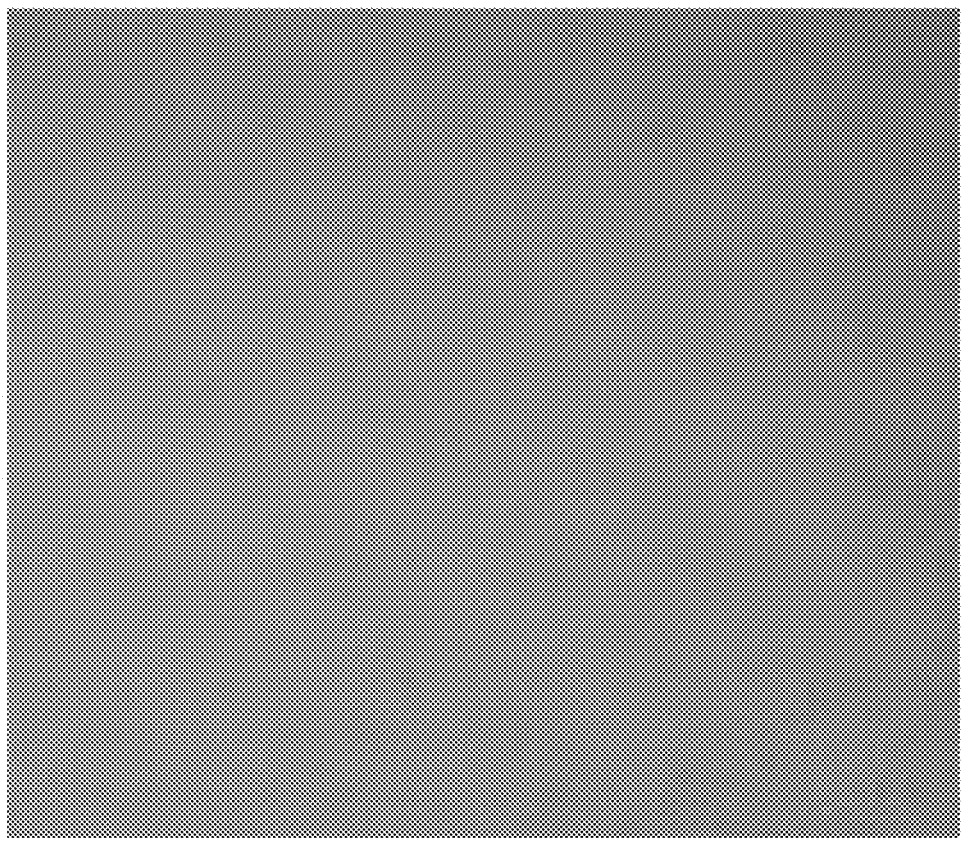

[Figure 25]
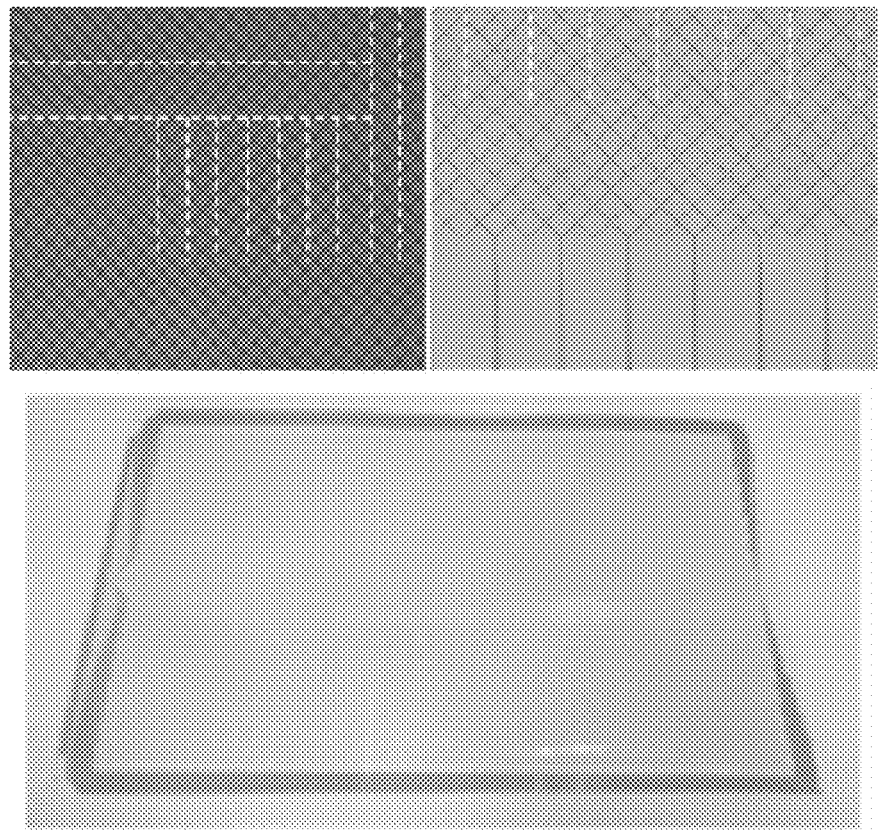

[Figure 26]
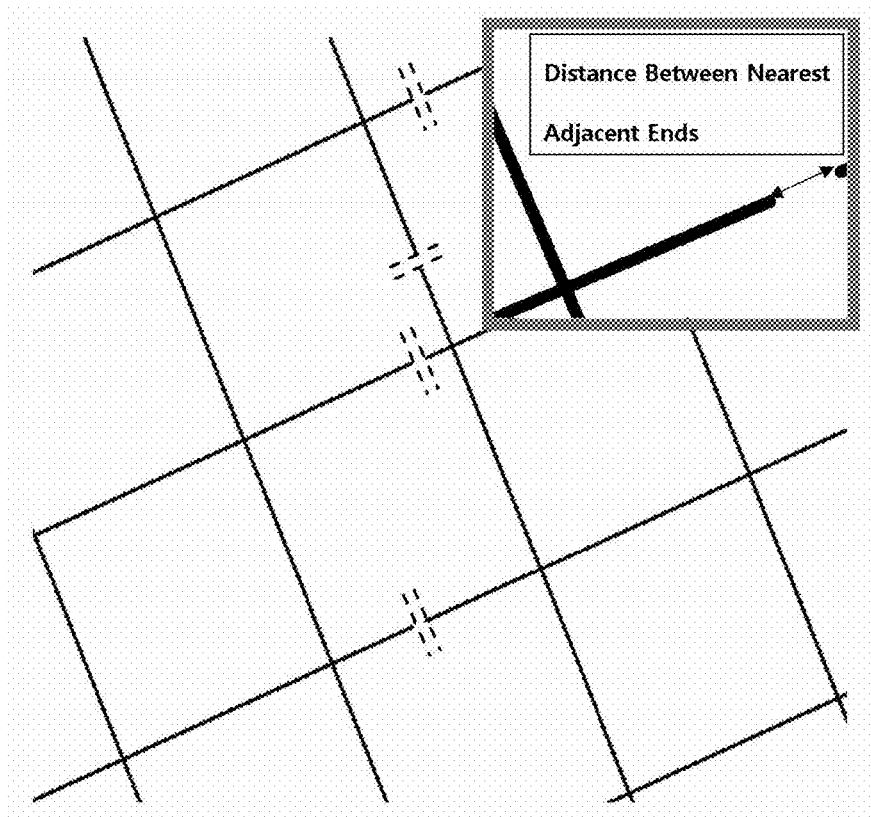

[Figure 27]
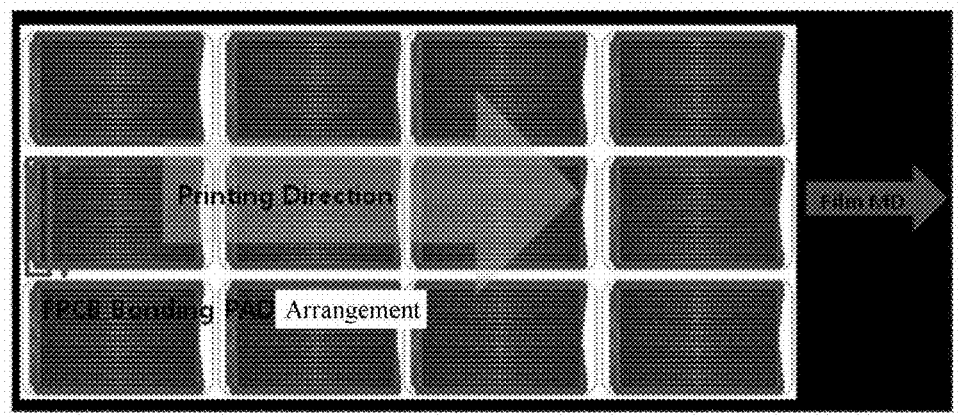
[Figure 28]

TOUCH SENSOR AND METHOD FOR MANUFACTURING SAME

TECHNICAL FIELD

This application is a National Stage Entry of International Application No. PCT/KR2014/012362, filed Dec. 15, 2014, and claims the benefit of and priority to Korean Application No. 10-2013-0155800, filed on Dec. 13, 2013, all of which are hereby incorporated by reference in their entirety for all purposes as if fully set forth herein.

The present application relates to a touch sensor and a method for preparing the same.

BACKGROUND ART

In general, a display device collectively refers to monitors for a TV or a computer, and includes a display element forming an image and a case supporting the display element.

Examples of the display element include a plasma display panel (PDP), a liquid crystal display (LCD), an electrophoretic display, and a cathode-ray tube (CRT). The display element may include an RGB pixel pattern for implementing an image and an additional optical filter.

The optical filter may include at least one of a reflection prevention film for preventing the external light, which is incident from the outside, from being reflected again to the outside, a near IR shield film for shielding the near IR generated in the display element in order to prevent malfunction of electronic devices, such as remote controllers, a color correction film for increasing the color purity by including a color control dye to control a color tone, and an electromagnetic wave shield film for shielding the electromagnetic wave generated in a display element when a display device is driven. Here, the electromagnetic wave shield film includes a transparent substrate and a metal mesh pattern provided on the substrate.

Meanwhile, with regard to the display device, as the spread of IPTVs is accelerated, a need for a touch function that uses hands as a direct input apparatus without a separate input apparatus such as remote controllers is growing. Further, a multi-touch function that is capable of recognizing a specific point and writing is also required.

A touch sensor performing the aforementioned function may be classified into the following types according to the type of detecting a signal.

That is, examples thereof include a resistive type of sensing a position, which is pressed down by pressure, through a change in current or voltage value while a direct current voltage is applied, a capacitive type of using capacitance coupling while an alternating current voltage is applied, an electromagnetic type of sensing a selected position as a change in voltage while a magnetic field is applied, and the like.

Among them, the resistive type and capacitive type touch sensors, which are most extensively spread, recognize the touch by changes in electric contact or capacitance using a transparent conductive film such as an ITO film. However, since the transparent conductive film has a high resistance of 100 ohms/square or more, the sensitivity is lowered when a device is manufactured in a large scale, and as the size of screen is increased, the cost of the ITO film is rapidly increased, and accordingly, it is not easy to achieve commercialization. In order to overcome this, there is an effort to implement an increase in size by using a metal pattern having high conductivity.

DETAILED DESCRIPTION OF THE INVENTION

Technical Problem

The present application has been made in an effort to reduce a cost of preparing a touch sensor and make the touch sensor lighter and thinner by improving a process of preparing the touch sensor.

Technical Solution

An exemplary embodiment of the present invention provides a touch sensor including: a substrate; and a driving electrode part, a sensing electrode part, and a wiring electrode part, which are provided on the same surface of the substrate, in which the driving electrode part, the sensing electrode part, and the wiring electrode part each include a conductive pattern including a shielding part and an opening, the wiring electrode part includes a first wiring electrode part disposed at a touch sensing region of the touch sensor and a second wiring electrode part disposed at a touch non-sensing region of the touch sensor, and the first wiring electrode part includes one or two or more bundles of wirings which connect the driving electrode part or the sensing electrode part to the second wiring electrode part, the wirings are each composed of a network pattern, and in a bundle including the largest number of wirings among the bundles, a width (W) of the bundle, the number (n) of wirings included in the bundle, and a minimum value (P) among the distances between center points of adjacent network structures sharing at least one side in a network pattern constituting the wirings satisfy the following Equation 1.

$$\frac{W}{n} \times \sqrt{2} \geq P \qquad \text{[Equation 1]}$$

Further, another exemplary embodiment of the present application provides a touch sensor including: a substrate; and a driving electrode part, a sensing electrode part, and a wiring electrode part, which are provided on the same surface of the substrate, in which the driving electrode part, the sensing electrode part, and the wiring electrode part include a conductive pattern including a shielding part and an opening, the wiring electrode part includes a first wiring electrode part disposed at a touch sensing region of the touch sensor and a second wiring electrode part disposed at a touch non-sensing region of the touch sensor, and the first wiring electrode part includes one or two or more bundles of wirings which connect the driving electrode part or the sensing electrode part to the second wiring electrode part, the bundle is composed of a form of pattern in which closed figures having two disconnection points are consecutively disposed in a direction from one side of the substrate, which is adjacent to an end of the second wiring electrode part, to the other side of a substrate facing the one side, a virtual straight line connecting adjacent disconnection points of the consecutively disposed closed figures as the shortest distance has one or more inflection points, and an angle which the virtual straight line forms at the inflection point is 90° or more, and a pattern tangent to the virtual straight line electrically connects the driving electrode part or the sensing electrode part to the second wiring electrode part.

In addition, still another exemplary embodiment of the present application provides a display device including the touch sensor.

Advantageous Effects

According to an exemplary embodiment of the present application, a thickness of the touch sensor may be minimized because a single-sided one-sheet type touch sensor may be provided, and a method for preparing the touch sensor is easy because all the conductive patterns are formed on a single side. In addition, the touch sensor is a one-sheet type, and thus is advantageous in that the touch sensor need not be laminated when compared to that in the related art in which a touch sensor is formed using two or more substrates. Furthermore, since the sensing electrode part and the driving electrode part are disposed on the same surface, it is easy to install and attach a flexible printed circuit board (FPCB). Further, since the touch sensor is a one-sheet type, the light transmittance is excellent as compared to a two-sheet type touch sensor. In addition, when a functional surface film is laminated on the surface of the touch sensor, the step difference is not so large, so that there is an advantage in that bubbles are not filled.

According to an exemplary embodiment of the present application, it is possible to reduce a cost of preparing a touch sensor and make the touch sensor lighter and thinner by improving a process of preparing the touch sensor.

BRIEF DESCRIPTION OF DRAWINGS

FIGS. 1 to 3 are views schematically illustrating a touch sensor in the related art.

FIG. 4 is a view schematically illustrating a wiring electrode part of the touch sensor in the related art.

FIGS. 5 and 6 are views schematically illustrating a touch sensor according to an exemplary embodiment of the present application.

FIGS. 7 to 9 are views schematically illustrating the moiré evaluation results of the touch sensor according to an exemplary embodiment of the present application.

FIGS. 10 to 14 are views schematically illustrating the aperture evaluation results of the touch sensor according to an exemplary embodiment of the present application.

FIGS. 15 and 16 are views schematically illustrating the conductive metal line patterns of the wiring electrode part of the touch sensor according to an exemplary embodiment of the present application.

FIGS. 17 to 24 are views schematically illustrating the moiré evaluation results according to the form of the conductive metal line pattern of the wiring electrode part of the touch sensor according to an exemplary embodiment of the present application.

FIG. 25 is a view schematically illustrating a touch sensor according to an exemplary embodiment of the present application and a display device including the same.

FIG. 26 is a view schematically illustrating disconnection points of the conductive metal line pattern according to an exemplary embodiment of the present application.

FIG. 27 is a view schematically illustrating the touch sensor according to an exemplary embodiment of the present application.

FIG. 28 is a view schematically illustrating a printing direction of the wiring electrode of the touch sensor according to an exemplary embodiment of the present application.

BEST MODE

Hereinafter, the present application will be described in detail.

In the case of the existing touch sensor, products in which a driving electrode pattern (Tx pattern), which serves a voltage driving role, and a sensing electrode pattern (Rx pattern), which receives a mutual capacitance signal for this pattern and transfers the signal to a circuit, are each formed on a separate substrate, or the driving electrode pattern and the sensing electrode pattern are each formed on both surfaces of the substrate, that is, products in a form in which the driving electrode pattern and the sensing electrode pattern are spatially separated are most popular. In order to maximize the touch sensitivity and the value of electrostatic capacity, it has been taken as a core technology to design and prepare a touch sensor in consideration of a layer structure, the permittivity of a dielectric material to be inserted between the layers, and the like. However, in the system, an expense issue on the cost side of the sensor has been continuously generated in terms of using two sheets of an optically clear adhesive (OCA) corresponding to the dielectric material and an indium tin oxide (ITO) film used as a transparent electrode, and a technology of designing and preparing a single-sided one layer touch sensor in which a driving electrode pattern (Tx pattern) and a sensing electrode pattern (Rx pattern) are present on one surface has recently emerged in order to solve the expense issue.

The single-sided one layer touch sensor may be largely classified into a method of using self capacitance, a method of using mutual capacitance, a so-called Fxy system of using a metal bridge, and the like. However, in fact, each of the system of using self capacitance and the system of using a metal bridge is not greatly attractive due to the performance issue (in the case of self capacitance, a ghost phenomenon and the limitation on the multi touch), the yield issue among the preparation processes, and the like.

In addition to these two systems, the method of using mutual capacitance has been recently greatly highlighted, and the reason is that in the method of using mutual capacitance, there are an issue of sensitivity and the like and an issue of the pattern preparation from the viewpoint that a wiring region is disposed at a screen part because a region at which the capacitance is formed is usually formed as a surface in the same space, but the method of using mutual capacitance has excellent characteristics as compared to the other systems from the viewpoint of performance. Accordingly, in the case of ITO, development activities for implementing this are being actively conducted. However, in the system, there is still an issue of resistance due to the use of a material having a relatively high resistance, that is, the ITO, and the limitation of an applicable length is limited to 5 inches or less due to the issue.

In order to solve these problems, the present application is intended to propose a single-sided one layer touch sensor using conductive metal lines as a driving electrode pattern and a sensing electrode pattern.

A single-sided one layer touch sensor using an ITO electrode in the related art is schematically illustrated in the following FIGS. 1 and 2. Further, a driving electrode pattern and a sensing electrode pattern of the single-sided one layer touch sensor using an ITO electrode in the related art are more specifically illustrated in the following FIG. 3.

In the following FIG. 3, a sensing electrode pattern (Rx pattern) and a driving electrode pattern which is a pattern in the X form are marked. That is, the sensing electrode pattern (Rx pattern) is designed to have an additionally larger area than the driving electrode pattern (Tx pattern), and signals are applied through a common electrode. On the contrary, the driving electrode pattern (Tx pattern) is implemented as a pattern in the X form, and a wiring part is formed through a dead zone region in order to apply signals to each driving electrode pattern (Tx pattern).

It is most preferred that the dead zone according to the wiring part region is minimized from the viewpoint of touch resolution, and for this purpose, it is necessary to appropriately control the width of the conductive metal line and/or space of the dead zone. In this case, when the width of space is a predetermined value or more, the pattern may be a pattern in an advantageous form in the mutual interference between signals. In addition, in order to secure conductivity, the width of the conductive metal line needs to be wide, and a smaller width of space is advantageous. Accordingly, it is preferred to appropriately control the width of conductive metal line and/or space of the dead zone.

Furthermore, parts other than the sensing electrode pattern, the driving electrode pattern, and the dead zone in the following FIG. 3 are a region corresponding to a region in which a dummy electrode or a pattern is not formed, and may be a region which does not greatly affect substantial electrical connectivity, and the like.

In the present application, a specific content in which the driving electrode pattern and the sensing electrode pattern of the above-described single-sided one layer touch sensor are formed of a conductive metal layer as follows.

In the case of a general ITO pattern, the concept of the line/space is introduced into the formation of the wiring part, such that a pattern in the form as illustrated in the following FIG. 4 is generally formed. Accordingly, in the present application, a design to minimize the space has been introduced in order to secure the connectivity of the conductive metal line and enhance the yield.

A touch sensor according to an exemplary embodiment of the present application is a touch sensor including: a substrate; and a driving electrode part, a sensing electrode part, and a wiring electrode part, which are provided on the same surface of the substrate, in which the driving electrode part, the sensing electrode part, and the wiring electrode part each include a conductive pattern including a shielding part and an opening, the wiring electrode part includes a first wiring electrode part disposed at a touch sensing region of the touch sensor and a second wiring electrode part disposed at a touch non-sensing region of the touch sensor, and the first wiring electrode part includes one or two or more bundles of wirings which connect the driving electrode part or the sensing electrode part to the second wiring electrode part, the wirings are each composed of a network pattern, and in a bundle including the largest number of wirings among the bundles, a width (W) of the bundle, the number (n) of wirings included in the bundle, and a minimum value (P) among the distances between center points of adjacent network structures sharing at least one side in a network pattern constituting the wirings satisfy the following Equation 1.

$$\frac{W}{n} \times \sqrt{2} \geq P \qquad \text{[Equation 1]}$$

In the present application, the driving electrode part, the sensing electrode part, and the wiring electrode part each include a conductive pattern including a shielding part and an opening. The shielding part means a region in which a material, which constitutes the conductive patterns of a driving electrode part, a sensing electrode part, and a wiring conductive part, for example, a conductive metal line is provided on a substrate, and the opening means a region in which the conductive metal line is not provided on the substrate. That is, the shielding part may mean a region which is not optically transparent, and the transmittance of the shielding part may be, for example, 20% or less, and 10% or less.

In the present application, a pattern form in the art, such as a mesh pattern, may be used as the network pattern. The mesh pattern may include a polygonal pattern including one or more forms of a triangle, a quadrangle, a pentagon, a hexagon, and an octagon.

In the present application, the distance between center points of adjacent network structures sharing at least one side in the network pattern constituting the wirings may correspond to a pitch of a mesh pattern when the network pattern is a regular mesh pattern, and may correspond to a distance between center points of an adjacent polygonal patterns sharing at least one side or a distance between centers of gravity when the network pattern is a polygonal pattern including various forms.

In an exemplary embodiment of the present application, Equation 1 may be represented by the following Equation 2.

$$\frac{W}{n} \geq P \times \cos\theta 1 \qquad \text{[Equation 2]}$$

In Equation 2, W, n, and P are the same as those defined in Equation 1, and

θ1 represents a smaller value of angles between a straight line connecting the shortest distance in a width direction of the bundle and a straight line connecting the center points of adjacent network structures sharing at least one side as the shortest distance.

In an exemplary embodiment of the present application, the touch sensing region of the touch sensor may include a driving electrode part, a sensing electrode part, and a first wiring electrode part. Further, the touch non-sensing region of the touch sensor may include a second wiring electrode part. In the present application, the touch sensing region may also be expressed as a term such as a touch response region, a touch permissible region, and a touch activated region.

The form of the driving electrode part and the sensing electrode part of the touch sensor according to an exemplary embodiment of the present application is the same as that illustrated in the following FIG. 5. Furthermore, the form of the wiring electrode part of the touch sensor according to an exemplary embodiment of the present application is the same as that illustrated in the following FIG. 6.

A touch sensor according to another exemplary embodiment of the present application is a touch sensor including: a substrate; and a driving electrode part, a sensing electrode part, and a wiring electrode part, which are provided on the same surface of the substrate, in which the driving electrode part, the sensing electrode part, and the wiring electrode part include a conductive pattern including a shielding part and an opening, the wiring electrode part includes a first wiring electrode part disposed at a touch sensing region of the touch sensor and a second wiring electrode part disposed at a touch non-sensing region of the touch sensor, and the first wiring electrode part includes one or two or more bundles of wirings which connect the driving electrode part or the sensing electrode part to the second wiring electrode part, the bundle is composed of a form of pattern in which closed figures having two disconnection points are consecutively disposed in a direction from one side of the substrate, which is adjacent to an end of the second wiring electrode part, to the other side of a substrate facing the one side, a virtual straight line connecting adjacent disconnection points of the consecutively disposed closed figures as the shortest distance has one or more inflection points, and an angle which the virtual straight line forms at the inflection point is 90° or more, and a pattern tangent to the virtual straight line electrically connects the driving electrode part or the sensing electrode part to the second wiring electrode part.

In the present application, the disconnection point means a region in which a portion of a border pattern of a closed figure is disconnected, and thus interrupts electrical connection with each other, and may also be expressed as a term such as a disconnection point and a disconnection part. That is, when the wiring electrode part includes a pattern composed of a conductive metal line, the pattern may include two or more metal lines spaced apart from each other in a length direction of the conductive metal line by the disconnection point.

In this case, as a result of evaluating a Moire after splitting and preparing the line width of the conductive pattern of the wiring electrode part split in various line widths, it was confirmed that a Moire by the wiring electrode part is not generated during the full bonding in a display when an average diameter of the disconnection points or a width of the disconnection part is within 13 μm, and that the result was the most advantageous when the average diameter of the disconnection points or the width of the disconnection part is 7 μm or less. As an exemplary embodiment of the present application, a result of evaluating a Moire of a wiring electrode part including a conductive pattern in which the average diameter of the disconnection points or the width of the disconnection part is 15 μm is illustrated in the following FIG. 7, a result of evaluating a Moire of a wiring electrode part including a conductive pattern in which the average diameter of the disconnection points or the width of the disconnection part is 10 μm is illustrated in the following FIG. 8, and a result of evaluating a Moire of a wiring electrode part including a conductive pattern in which the average diameter of the disconnection points or the width of the disconnection part is 7 μm is illustrated in the following FIG. 9. In the present application, the average diameter of the disconnection points or the width of the disconnection part may mean a distance between the nearest adjacent ends of two or more conductive metal lines spaced apart from each other. The distance between the nearest adjacent ends of two or more conductive metal lines spaced from each other means a distance between the ends, which are closest to each other in two or more conductive metal lines spaced from each other, and a specific example thereof is illustrated in the following FIG. 26.

In an exemplary embodiment of the present application, Equation 1 may be represented by the following Equation 3.

$$\frac{W}{n} \geq P \times \cos\theta2 \qquad \text{[Equation 3]}$$

In Equation 3, W, n, and P are the same as those defined in Equation 1, and

θ2 represents a smaller value of angles between a straight line in a direction vertical to a virtual straight line connecting the disconnection points as the shortest distance and a straight line connecting the center points of adjacent network structures sharing at least one side as the shortest distance.

In an exemplary embodiment of the present application, the longest portion in length between inflection points in the virtual straight line may be parallel with at least one side constituting the closed figure, or may form an angle of more than 0° and less than 90°.

In an exemplary embodiment of the present application, at least a portion of the conductive patterns of the driving electrode part and the sensing electrode part may additionally include the disconnection point or the disconnection part as described above. In this case, the average diameter of the disconnection points or the width of the disconnection part may be 13 μm or less, 10 μm or less, or 7 μm or less, but is not limited thereto.

Furthermore, evaluation by various disconnection methods was performed in order to enhance uniformity during the attachment of a display by changing the disconnection method and allowing the transmittance of each portion to maximally coincide.

The results of evaluating the aperture ratio of the touch sensor according to an exemplary embodiment of the present application are schematically illustrated in the following FIGS. 10 to 14. In the present application, the aperture ratio may mean a ratio of the entire flat area of the opening based on the entire flat area of the driving electrode part, the sensing electrode part, and the wiring electrode part.

More specifically, in a touch sensor in the following FIG. 10, the disconnection of a conductive metal line pattern was treated with dots having a predetermined size, and then dummy pattern portions were treated with an irregular pattern. Further, in a touch sensor in the following FIG. 11, the conductive pattern region and the dummy pattern region of the sensing electrode part were disconnection-treated with dots different from each other to minimize the difference in aperture ratio with the wiring electrode part. In addition, in a touch sensor in the following FIG. 12, the conductive pattern region and the dummy pattern region of the sensing electrode part were disconnection-treated with dots having the same size, but the interval between the dots was varied for the conductive pattern region and the dummy pattern region of the sensing electrode part. Furthermore, in a touch sensor in the following FIG. 13, the conductive pattern region and the dummy pattern region of the sensing electrode part were disconnection-treated with dots having the same size, but the interval between the dots was introduced for the conductive pattern region and the dummy pattern region of the sensing electrode part to be maximally similar to each other. Further, in a touch sensor in the following FIG. 14, the transmittance of the wiring part was maintained by disposing the disconnected segments to be immediately adjacent to each other instead of removing the disconnected segments after the disconnection.

As a result of evaluation of the following FIGS. 10 to 14, it could be observed that the conductive metal pattern according to an exemplary embodiment of the present application was inconspicuous. In particular, the cases of FIGS. 11, 13 and 14 may exhibit very excellent effects due to the coincidence of transmittance.

Accordingly, in the present application, the width of the bundle is defined as W and based on the area of (W×W), the deviation in the aperture ratios among any regions of the touch sensor corresponding to the area of (W×W) may be within 10%, within 5%, or within 3%, but is not limited thereto. Examples of any regions of the touch sensor include a region in the driving electrode part, a region in the sensing electrode part, a region in the wiring electrode part, a region in which the driving electrode part and the sensing electrode part are combined, a region in which the driving electrode part and the wiring electrode part are combined, a region in which the sensing electrode part and the wiring electrode part are combined, and the like.

In an exemplary embodiment of the present application, the driving electrode part and the sensing electrode part are composed of a conductive metal line, the disconnection point or the disconnection part may be provided in an intersecting point region in which the conductive metal lines in the driving electrode part or the sensing electrode part are intersected with each other, but is not limited thereto. When the disconnection point is provided in an intersecting point region in which conductive metal lines in the driving electrode part or the sensing electrode part are intersected with each other, the diameter of the disconnection point may be 40 μm or less, or 20 μm or less from the viewpoint of Moire characteristics, visibility and the like, but is not limited thereto. When a disconnection point is provided in the intersecting point region, optical characteristics are illustrated in the following FIG. 27.

In addition, a conductive metal line which is electrically isolated may be additionally provided within a predetermined distance based on a center of the disconnection point or the disconnection part. The length of the conductive metal line which is electrically isolated is not particularly limited, and may deviate from the average diameter of the disconnection points or the width of the disconnection part by about 10%. Furthermore, the conductive metal line which is electrically isolated may be provided in parallel with the disconnection point or the disconnection part, and may be provided vertically or irregularly to the disconnection point or the disconnection part. Further, the conductive metal line which is electrically isolated may have an area of 80% to 120% with respect to the product of the average diameter of the disconnection points or the width of the disconnection part. In addition, the distance between the end of the conductive metal line which is electrically isolated and the end of the adjacent conductive metal line may be 13 μm or less. The size, form, length and the like of the conductive metal line which is electrically isolated may be appropriately adjusted such that the deviation from aperture ratios among any regions of the touch sensor is 10% or less.

Examples of the important part along with the concealment of the conductive pattern include the minimization of the dead zone in the wiring electrode part as previously mentioned.

In order to confirm a design for minimizing the dead zone in the present application, the design was observed by fixing the width of the bundle of the wiring electrode part and varying the pitch and angle of the conductive metal line pattern of the wiring electrode part. The results are illustrated in the following FIGS. 15 and 16.

As a result, in the case where the conductive pattern constituting the wiring electrode part is a mesh pattern and the mesh pattern is in a regular quadrilateral form, when the width of the bundle is assumed as W, the pitch of the mesh pattern is defined as P, and the number of wirings included in the bundle is defined as n, it could be confirmed that the width of the bundle was formed regardless of the change in angle of the mesh pattern in the case of satisfying the relationship of Equation 1.

In this case, it could be confirmed that the wiring electrode part was formed without any particular difficulty even when the directivity of disconnection for forming the wiring electrode part is not a straight line, and that most preferably, the case of having a Moire avoidance angle of 45° was advantageous in all the cases.

In particular, the case where the directivity of disconnection for forming the wiring electrode part is a straight line is illustrated in the following FIG. 15, and the case where the directivity of disconnection for forming the wiring electrode part is not a straight line is illustrated in the following FIG. 16. Here, the directivity of disconnection means a direction of a line represented when adjacent disconnection points or disconnection parts are connected as the shortest distance. As in the result of the following FIG. 16, even when the directivity of disconnection for forming the wiring electrode part is not a straight line, for example, even when the directivity is a zigzag line, a combination of a straight line and a zigzag line, and the like, it is possible to set the flow direction of current similarly to the case where the directivity of disconnection is a straight line, by appropriately designing the disconnection position.

In addition, as an exemplary embodiment of the present application, the results of evaluating the Moire according to the form of the conductive metal line pattern of the wiring electrode part are illustrated in the following FIGS. 17 to 20 and Table 1. Furthermore, the results of evaluating the Moire of the conductive metal line patterns according to the following FIGS. 17 to 20 are illustrated in the following FIGS. 21 to 24.

TABLE 1

| | FIG. 17 | FIG. 18 | FIG. 19 | FIG. 20 |
|---|---|---|---|---|
| Pitch | 50 ☐☐ μm regular quadrilateral mesh pattern | 50 ☐☐ μm regular quadrilateral mesh pattern | 70 ☐☐ μm regular quadrilateral mesh pattern | 50 to 100 μm parallelogram pattern |
| Number of intersecting points | 1 | Repetition of 2 - 1 | 1 | 2 (Inclined type) |
| Width of wiring part | 1.167 mm | 1.732 mm | 1.584 mm | 1.602 mm |

According to the results, it can be seen that the optimum bundle width is formed when 16 wirings are formed according to the pitch of the mesh pattern.

Furthermore, the touch sensor according to the present application may recognize a touch input using a mutual capacitance system. In particular, the touch sensor according to the present application is intended for electrical isolation between the driving electrode part and the sensing electrode part using a disconnection point or disconnection part, a dummy pattern and the like without inserting a separate insulation material between the driving electrode part and the sensing electrode part, and is different from a touch sensor in the related art using a metal bridge, an insulation layer, the like.

In the present application, the conductive patterns of the driving electrode part, the sensing electrode part, and the wiring electrode part may be each formed by an independent printing process, and the conductive patterns of the driving electrode part, the sensing electrode part, and the wiring electrode part may be simultaneously formed by a one-time printing process.

Accordingly, the conductive patterns of the driving electrode part, the sensing electrode part, and the wiring electrode part may have the same line height.

Further, at least a part of the conductive patterns of the driving electrode part and the wiring electrode part include regions connected to each other, and the regions connected to each other may have no coupling part. In addition, at least a part of the conductive patterns of the sensing electrode part and the wiring electrode part include regions connected to each other, and the regions connected to each other may have no coupling part.

In the present application, the absence of a coupling part means that there is no trace artificially coupled in physically connected conductive patterns. Since the touch part and the wiring part are formed by different methods in the related art due to the typical difference between the touch part and the wiring part in terms of pattern type and size, there was no alternative but to form a coupling part at a portion where these patterns were connected to each other. However, in the present application, since a touch part, a wiring part, and the like may be formed using a single process, the present application may have characteristics that there is no coupling part and the line heights thereof may be the same as each other.

In the present application, the same line height means that the standard deviation of the line height is less than 10%, preferably less than 5%, or more preferably less than 2%.

In the present application, the conductive patterns of the driving electrode part, the sensing electrode part, and the wiring electrode part are provided on a substrate, and may be all provided on the same surface of the substrate.

A high-hardness hard coating layer may be additionally included on at least one surface of the substrate. In this case, a high-hardness hard coating layer is provided on any one surface of the substrate, and the conductive patterns of the driving electrode part, the sensing electrode part, and the wiring electrode part may be provided on the other surface of the substrate, but the present application is not limited thereto. Further, the conductive patterns of the driving electrode part, the sensing electrode part, and the wiring electrode part may be provided on the high-hardness hard coating layer, but the present application is not limited thereto.

The high-hardness hard coating layer may include: a binder monomer including a tri- to hexa-functional acrylate-based monomer; an inorganic particulate; a photoinitiator; and an organic solvent, and may be formed using a hard coating composition having a weight ratio of the solid content:the organic solvent of 70:30 to 99:1, based on a solid content including the binder monomer, the inorganic particulate, and the photoinitiator.

In addition, the high-hardness hard coating layer may be formed using a solvent-free type hard coating composition including a binder monomer including a tri- to hexa-functional acrylate-based monomer; an inorganic particulate; and a photoinitiator.

A specific description on the hard coating composition is as follows.

The acrylate-based means not only acrylates, but also methacrylates, or derivatives in which substituents are introduced into acrylates or methacrylates.

Examples of the tri- to hexa-functional acrylate-based monomer include trimethylolpropane triacrylate (TMPTA), trimethylolpropane ethoxy triacrylate (TMPEOTA), glycerine propoxylated triacrylate (GPTA), pentaerythritol tetraacrylate (PETA), or dipentaerythritol hexaacrylate (DPHA), and the like. The tri- to hexa-functional acrylate-based monomer may be used either alone or in combination of different kinds thereof.

According to an exemplary embodiment of the present invention, the binder monomer may further include a mono- to bi-functional acrylate-based monomer.

Examples of the mono- to bi-functional acrylate-based monomer include hydroxyethyl acrylate (HEA), hydroxyethyl methacrylate (HEMA), hexanediol diacrylate (HDDA), or tripropyleneglycol diacrylate (TPGDA), ethyleneglycol diacrylate (EGDA), and the like. The mono- to bi-functional acrylate-based monomer may also be used either alone or in combination of different kinds thereof.

According to an exemplary embodiment of the present invention, the binder monomer may be included in an amount of about 35 to about 85 parts by weight, or about 45 to about 80 parts by weight, based on 100 parts by weight of a solid content including the binder monomer, the inorganic particulate, and the photoinitiator. When the binder monomer is within the aforementioned range, it is possible to form a hard coating film exhibiting high hardness and having less generation of curls or cracks due to excellent process ability.

Furthermore, when the binder monomer further includes a mono- to bi-functional acrylate-based monomer, the content ratio of the mono- to bi-functional acrylate-based monomer and the tri- to hexa-functional acrylate-based monomer is not particularly limited, but according to an exemplary embodiment of the present invention, the mono- to bi-functional acrylate-based monomer and the tri- to hexa-functional acrylate-based monomer may be included such that the weight ratio thereof is about 1:99 to about 50:50, or about 10:90 to about 50:50, or about 20:80 to about 40:60. When the mono- to bi-functional acrylate-based monomer and the tri- to hexa-functional acrylate-based monomer are included at the weight ratio, high hardness and flexibility may be imparted thereto without deterioration in other physical properties such as curl characteristics or light resistance.

According to another exemplary embodiment of the present application, the binder monomer may further include a photocurable elastic polymer.

Throughout the present specification, the photocurable elastic polymer refers to a polymer material including a functional group, which may be crosslinking polymerized by UV irradiation, and exhibiting elasticity.

According to an exemplary embodiment of the present application, the photocurable elastic polymer may have an elongation of about 15% or more, for example, about 15% to about 200%, or about 20% to about 200%, or about 20% to about 150%, when measured with the ASTM D638.

When the hard coating composition of the present application further includes a photocurable elastic polymer, the photocurable elastic polymer may be crosslinking-polymerized with the tri- to hexa-functional acrylate-based monomer and form a hard coating layer after curing, and may impart flexibility and impact resistance to a hard coating layer to be formed.

When the binder monomer further includes a photocurable elastic polymer, the content ratio of the photocurable elastic polymer and the tri- to hexa-functional acrylate-based monomer is not particularly limited, but according to an exemplary embodiment of the present invention, the photocurable elastic polymer and the tri- to hexa-functional acrylate-based monomer may be included such that the weight ratio thereof is about 5:95 to about 20:80. When the tri- to hexa-functional acrylate-based monomer and the photocurable elastic polymer are included at the weight ratio, high-hardness and flexibility may be imparted thereto without deterioration in other physical properties such as curl characteristics or light resistance, and damage caused by external impact may be prevented to secure excellent impact resistance.

According to an exemplary embodiment of the present application, the photocurable elastic polymer may be a polymer or oligomer having a weight average molecular weight in the range of about 1,000 to about 600,000 g/mol, or about 10,000 to about 600,000 g/mol.

The photocurable elastic polymer may be one or more selected from the group consisting of, for example, polycaprolactone, urethane acrylate-based polymers, and polyrotaxane.

Polycaprolactone among the materials which may be used as the photocurable elastic polymer is formed by the ring-opening polymerization of caprolactone, and has excellent physical properties such as flexibility, impact resistance and durability.

The urethane acrylate-based polymer has characteristics excellent in elasticity and durability, including urethane bonds.

The polyrotaxane means a compound in which dumbbell shaped molecules and macrocycles are structurally sandwiched. The dumbbell shaped molecule includes a predetermined linear molecule and blocking groups disposed at both ends of the linear molecule, the linear molecule passes through the macrocycle, and the macrocycle may move along the linear molecule and is prevented from being separated by the blocking group.

According to an exemplary embodiment of the present invention, it is possible to include a rotaxane compound including: a macrocycle to which a lactone-based compound in which a (meth)acrylate-based compound is introduced into the ends thereof is bonded; a linear molecule passing through the macrocyle; and a blocking group disposed at both ends of the linear molecule and preventing the macrocycle from being separated.

In this case, the macrocycle may be used without any particular limitation as long as the macrocycle has a size sufficient enough to pass through or surround the linear molecule, and may also include a functional group such as a hydroxyl group, an amino group, a carboxyl group, a thiol group or an aldehyde group, which may be reacted with another polymer or compound. Specific examples of the macrocycle include α-cyclodextrin, β-cyclodextrin, γ-cyclodextrin, or mixtures thereof.

Further, as the linear molecule, a compound having a straight chain form may be used without any particular limitation as long as the compound has a predetermined molecular weight or more, but a polyalkylene-based compound or a polylactone-based compound may be used. Specifically, it is possible to use a polyoxyalkylene-based compound having an oxyalkylene repeating unit having 1 to 8 carbon atoms, or a polylactone-based compound having a lactone-based repeating unit having 3 to 10 carbon atoms.

Meanwhile, the blocking group may be appropriately adjusted according to characteristics of a rotaxane compound to be prepared, and it is possible to use one or two or more selected from the group consisting of, for example, a dinitrophenyl group, a cyclodextrin group, an adamantane group, a trirle group, a fluorescein group, and a pyrene group.

The aforementioned polyrotaxane compound has excellent scratch resistance, and thus may exhibit a self-repairing ability when scratch or external damage is generated.

The hard coating composition of the present application includes an inorganic particulate. In this case, the inorganic particulate may be included in the form of being dispersed in the binder monomer.

According to an exemplary embodiment of the present application, it is possible to use an inorganic particulate having a nanoscale particle diameter, for example, a nano-particulate having a particle diameter of about 100 nm or less, or about 10 to about 100 nm, or about 10 to about 50 nm, as the inorganic particulate. In addition, it is possible to use, for example, a silica particulate, an aluminum oxide particle, a titanium oxide particle, or a zinc oxide particle, and the like, as the inorganic particulate.

The hardness of the hard coating film may be further enhanced by including the inorganic particulate.

According to an exemplary embodiment of the present application, the inorganic particulate may be included in an amount of about 10 to about 60 parts by weight, or about 20 to about 50 parts by weight, based on 100 parts by weight of a solid content including the binder monomer, the inorganic particulate, and the photoinitiator. By including the inorganic particulate within the range, it is possible to achieve an effect of enhancing the hardness of the hard coating film due to the addition of inorganic particulates within a range in which physical properties thereof do not deteriorate.

The hard coating composition of the present application includes a photoinitiator.

According to an exemplary embodiment of the present application, examples of the photoinitiator include 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoyl formate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone diphenyl (2,4,6-trimethylbenzoyl)-phosphine oxide, or bis(2,4,6-trimethylbenzoyl)-phenylphosphine oxide, and the like, but are not limited thereto. Furthermore, examples of a currently commercially available product include Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and the like. These photoinitiators may be used either alone or in combination of two or more different kinds thereof.

According to an exemplary embodiment of the present application, the photoinitiator may be included in an amount of about 0.5 to about 10 parts by weight, or about 1 to about 5 parts by weight, based on 100 parts by weight of a solid content including the binder monomer, the inorganic particulate, and the photoinitiator. When the photoinitiator is within the aforementioned range, it is possible to achieve a sufficient crosslinking photopolymerization without degrading physical properties of the hard coating film.

Meanwhile, the hard coating composition of the present application may additionally include an additive typically used in the art to which the present application pertains, such as a surfactant, an anti-yellowing agent, a leveling agent, and an antifouling agent, in addition to the above-described binder monomer, inorganic particulate, and photoinitiator. Further, the content thereof may be variously adjusted within a range in which physical properties of the hard coating composition of the present application will not deteriorate, and thus is not particularly limited, but the additive may be included in an amount of, for example, about 0.1 to about 10 parts by weight based on 100 parts by weight of the solid content.

According to an exemplary embodiment of the present application, for example, the hard coating composition may include a surfactant as an additive, and the surfactant may be a mono- to bi-functional fluorine-based acrylate, a fluorine-based surfactant, or a silicone-based surfactant. In this case, the surfactant may be included in the form of being dispersed or crosslinked in the crosslinking copolymer.

In addition, an anti-yellowing agent may be included as the additive, and examples of the anti-yellowing agent include a benzophenone-based compound, a benzotriazole-based compound, and the like.

The hard coating composition of the present application includes an organic solvent.

In the hard coating composition according to an exemplary embodiment of the present invention, the organic solvent may be included, based on a solid content including the binder monomer, the inorganic particulate, and the photoinitiator, at a weight ratio of the solid content:the organic solvent in a range of about 70:30 to about 99:1. The hard coating composition of the present invention includes the solid content at a high content as described above so as to obtain a high-viscosity composition, and accordingly, a thick coating is available, thereby forming a hard coating layer having a high thickness of, for example, 50 µm or more.

According to an exemplary embodiment of the present application, as the organic solvent, it is possible to use an alcohol-based solvent, such as methanol, ethanol, isopropyl alcohol and butanol, an alkoxy alcohol-based solvent, such as 2-methoxyethanol, 2-ethoxyethanol, and 1-methoxy-2-propanol, a ketone-based solvent, such as acetone, methyl ethyl ketone, methylisobutyl ketone, methylpropyl ketone and cyclohexanone, an ether-based solvent, such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether, and diethylene glycol-2-ethylhexyl ether, an aromatic solvent, such as benzene, toluene, and xylene, and the like either alone or in mixture.

According to an exemplary embodiment of the present application, the viscosity of the hard coating composition is not particularly limited as long as the viscosity is within a range having appropriate fluidity and applicability, but the hard coating composition may exhibit high viscosity due to a relatively high solid content. For example, the hard coating composition of the present invention may have a viscosity of about 100 to about 1,200 cps, or about 150 to about 1,200 cps, or about 300 to about 1,200 cps at a temperature of 25° C.

The solvent or solvent-free type hard coating composition of the present invention including the above-described components may be applied on a supporting substrate, and then photocured, thereby forming a hard coating layer.

In a hard coating film to be used as a cover for a mobile communication terminal or a tablet PC, it is important to enhance the hardness of the hard coating film to a level capable of replacing glass, and the thickness of the hard coating layer basically needs to be increased to a predetermined thickness or more, for example, 50 µm, or 70 µm, or 100 µm or more, in order to enhance the hardness of the hard coating film. However, as the thickness of the hard coating layer is increased, adhesion force is decreased because the curl phenomenon is also increased by a curing shrinkage, and a hard coating film is easily developed. Thus, a process of planarizing a supporting substrate may be additionally performed, but cracks occur on the hard coating layer during the planarization process, which is not preferred.

The hard coating composition according to the present application has less generation of curls or cracks even though applied in a high thickness and photocured on the supporting substrate in order to form a hard coating layer having high hardness, and it is possible to form a hard coating layer having high transparency and high hardness. For example, it is possible to form a hard coating layer having a thickness of about 50 µm or more, for example, a thickness of about 50 to about 150 µm, or about 70 to about 100 µm using the hard coating composition of the present application.

When a hard coating layer is formed using the hard coating composition of the present application, the hard coating layer may be formed by a typical method used in the art to which the present invention pertains.

For example, the hard coating composition according to the present application is first applied on one surface of a supporting substrate. In this case, a method of applying the composition is not particularly limited as long as the method may be used in the art to which the present invention pertains, and it is possible to use, for example, a bar coating method, a knife coating method, a roll coating method, a blade coating method, a die coating method, a micro gravure coating method, a comma coating method, a slot die coating method, a dip coating method, a solution casting method, and the like.

The hard coating composition is applied, and then a step of stabilizing the surface on which the hard coating composition has been applied may be selectively performed. The stabilization step may be performed, for example, by treating a supporting substrate, on which the hard coating composition has been applied, at a predetermined temperature. Accordingly, the applied surface may be more stabilized by planarizing the applied surface and volatilizing volatile components included in the hard coating composition.

Next, a hard coating layer may be formed by photocuring the applied hard coating composition by UV irradiation.

When a hard coating layer is formed on both surfaces of the supporting substrate using the hard coating composition of the present application, the hard coating layer may be formed by a two-step process including, a primary application and a primary photocuring of the first hard coating composition on one surface of the supporting substrate, and then a secondary application and a secondary photocuring of the second hard coating composition again on the other surface of the supporting substrate, that is, on the rear surface.

Since the UV irradiation is performed at a side opposite to the side on which the first hard coating composition has been applied in the secondary photocuring step, a planarized hard coating film may be obtained by offsetting curls generated by the curing shrinkage in the primary photocuring step in the opposite direction. Therefore, an additional planarization process is not necessary.

When a film including a hard coating layer formed by using the hard coating composition of the present application is exposed to a temperature of 50° C. or more and a humidity of 80% or more for 70 hours or more, and then is disposed on a flat surface, the maximum value of the distance of each corner or one side of the film, which is spaced apart from the flat surface, may be about 1.0 mm or less, or about 0.6 mm or less, or about 0.3 mm or less. More specifically, when the film is exposed to a temperature of 50 to 90° C. and a humidity of 80 to 90% for 70 to 100 hours, and then is disposed on the flat surface, the maximum value of the distance of each corner or one side of the film, which is spaced apart from the flat surface, may be about 1.0 mm or less, or about 0.6 mm or less, or about 0.3 mm or less.

A film including a hard coating layer formed by using the hard coating composition of the present application exhibits excellent high hardness, scratch resistance, high transparency, durability, light resistance, light transmittance and the like, and thus may be usefully used in various fields.

For example, the film including the hard coating layer formed by using the hard coating composition of the present application may have a pencil hardness of 7H or more, or 8H or more, or 9H or more at a 1 kg load.

In the present application, the high-hardness hard coating layer may be provided only on any one surface of a substrate, and may also be provided on both surfaces of the substrate.

In the present application, the conductive patterns of the driving electrode part, the sensing electrode part, and the wiring electrode part may each independently include a pattern formed of a conductive metal line. The pattern formed of the conductive metal line may include a straight line, a curved line, or a closed curve composed of a straight line or a curved line.

The conductive patterns of the driving electrode part and the sensing electrode part may be each independently a regular pattern, or an irregular pattern.

As the regular pattern, a pattern form in the art, such as a mesh pattern, may be used. The mesh pattern may include a regular polygonal pattern including one or more forms of a triangle, a quadrangle, a pentagon, a hexagon, and an octagon.

In the present application, the conductive patterns of the driving electrode part and the sensing electrode part are a regular pattern and include an intersecting point formed by crossing a plurality of any lines among lines constituting the pattern, and in this case, the number of intersecting points may be 3,000 to 122,500, 13,611 to 30,625, or 19,600 to 30,625 in an area of 3.5 cm×3.5 cm. In addition, according to the present application, when the pattern is mounted in a display, it was confirmed that the case where the number of intersecting points is 4,000 to 123,000 exhibits light characteristics which greatly damage the optical characteristics of the display.

Further, according to the present application, the conductive patterns of the driving electrode part and the sensing electrode part are an irregular pattern and include an intersecting point formed by crossing a plurality of any lines among the lines constituting the pattern, and in this case, the number of intersecting points may be 6,000 to 245,000, 3,000 to 122,500, 13,611 to 30,625, or 19,600 to 30,625 in an area of 3.5 cm×3.5 cm. In addition, according to the present application, when the pattern is mounted in a display, it was confirmed that the case where the number of intersecting points is 4,000 to 123,000 exhibits light characteristics which greatly damage the optical characteristics of the display.

The pitches of the conductive patterns of the driving electrode part, the sensing electrode part, and the wiring electrode part may be 600 μm or less or 250 μm or less, but the pitch may be adjusted according to the transmittance and conductivity desired by the person skilled in the art.

The conductive patterns of the driving electrode part, the sensing electrode part, and the wiring electrode part, which are used in the present application, are a material having specific resistance of appropriately $1 \times 10^6$ to $30 \times 10^6$ ohm·cm, and more preferably $7 \times 10^6$ ohm·cm or less.

In the present application, the conductive patterns of the driving electrode part and the sensing electrode part may be an irregular pattern.

The irregular pattern includes a border structure of continuously connected closed figures, the closed figures having the same form are not present in any irregular unit area (1 cm×1 cm), and the number of vertices of the closed figures may be different from the number of vertices of the quadrangles having the same number as the number of the closed figures. More specifically, the number of vertices of the closed figures may be greater than the number of vertices of quadrangles having the same number as the number of the closed figures, and 1.9 times to 2.1 times greater, but is not limited thereto.

The closed figures are continuously connected to each other, and for example, when the closed figures are polygons, the adjacent closed figures may have a form sharing at least one side.

The irregular pattern includes the border structure of continuously connected closed figures, the closed figures having the same form are not present in any unit area (1 cm×1 cm) in the irregular pattern, and the number of vertices of the closed figures may be different from the number of vertices of a polygon formed by connecting the shortest distances between centers of gravity of each of the closed figures. More specifically, the number of vertices of the closed figures may be greater than the number of vertices of a polygon formed by connecting the shortest distances between centers of gravity of each of the closed figures, and 1.9 times to 2.1 times greater than the number of vertices of the polygon, but is not limited thereto.

The irregular pattern includes the border structure of the continuously connected closed figures, the closed figures having the same form are not present in any unit area (1 cm×1 cm) in the irregular pattern, and a value of the following Equation 1 may be 50 or more in the closed figures.

(Standard deviation of distance between vertices/
Average of distance between vertices)×100  [Equation 1]

The value of Equation 1 may be calculated in the unit area of the conductive pattern. The unit area may be an area where the conductive pattern is formed, and for example, 3.5 cm×3.5 cm and the like, but is not limited thereto.

In the present application, it is defined that the vertex means a point at which the lines constituting the border of the closed figures of the conductive pattern intersect with each other.

The irregular pattern may have a form of the border structure of the closed figures formed by each disposing any points in regularly arranged unit cells, and then connecting the points to the closest point thereto compared to the distances of respective points from other points.

In this case, when a degree of irregularity is introduced into a method in which any points are disposed in the regularly arranged unit cells, the irregular pattern may be formed. For example, in the case where the degree of irregularity is given to be 0, if the unit cell is a regular quadrilateral, the conductive pattern has a regular quadrilateral mesh structure, and if the unit cell is a regular hexagon, the conductive pattern has a honeycomb structure. That is, the irregular pattern means a pattern where the degree of irregularity is not 0.

The conductive pattern having an irregular pattern form according to the present application may suppress a tipping phenomenon of a line forming a pattern and the like, may allow a uniform transmittance to be obtained from a display, may allow a line density with respect to a unit area to be maintained at the same level, and may secure uniform conductivity.

In the present application, a material for the conductive patterns of the driving electrode part, the sensing electrode part, and the wiring conductive part is not particularly limited, but preferably includes one or more selected from the group consisting of metals, metal oxides, metal nitrides, metal oxynitrides, and metal alloys. It is preferred that the materials for the conductive pattern of the driving electrode part, the sensing electrode part, and the wiring electrode part have excellent conductivity and are easily etched.

In the present application, even when a material having the total reflectance of 70 to 80% or more is used, it is possible to decrease the total reflectance, decrease visibility of the conductive pattern, and maintain or improve contrast characteristics.

Specific examples of the materials for the conductive patterns of the driving electrode part, the sensing electrode part, and the wiring electrode part preferably include a single film or a multilayered film including gold, silver, aluminum, copper, neodymium, molybdenum, nickel, or an alloy thereof. Here, the thickness of the conductive pattern of the driving electrode part, the sensing electrode part, and the wiring electrode part is not particularly limited, but is preferably 0.01 to 10 μm in terms of conductivity of the conductive pattern and economic efficiency of the forming process thereof.

In the present application, the conductive pattern of the driving electrode part and the sensing electrode part may have a line width of 10 μm or less, 7 μm or less, 5 μm or less, 4 μm or less, 2 μm or less, or 0.1 μm or more. More specifically, the conductive pattern of the driving electrode part and the sensing electrode part may have a line width of 0.1 to 1 μm, 1 to 2 μm, 2 to 4 μm, 4 to 5 μm, 5 to 7 μm, or the like, but is not limited thereto.

Further, the conductive pattern of the driving electrode part and the sensing electrode part may have a line width of 10 μm or less and a thickness of 10 μm or less, the conductive pattern of the driving electrode part and the sensing electrode part may have a line width of 7 μm or less and a thickness of 1 μm or less, and the conductive pattern of the driving electrode part and the sensing electrode part may have a line width of 5 μm or less and a thickness of 0.5 μm or less.

More specifically, in the present application, the conductive pattern of the driving electrode part and the sensing electrode part may have a line width of 10 μm or less, and in the conductive pattern of the driving electrode part and the sensing electrode part, the number of vertices of the closed figures in an area of 3.5 cm×3.5 cm may be 6,000 to 245,000. In addition, the conductive pattern of the driving electrode part and the sensing electrode part may have a line width of 7 μm or less, and in the conductive pattern, the number of vertices of the closed figures in an area of 3.5 cm×3.5 cm may be 7,000 to 62,000. In addition, the conductive pattern of the driving electrode part and the sensing electrode part may have a line width of 5 μm or less, and in the conductive pattern of the driving electrode part and the sensing electrode part, the number of vertices of the closed figures in an area of 3.5 cm×3.5 cm may be 15,000 to 62,000.

The aperture ratio of the conductive patterns of the driving electrode part, the sensing electrode part, and the wiring electrode part, that is, the ratio of the area not covered by the pattern may be 70% or more, 85% or more, or 95% or more. Furthermore, the aperture ratio of the conductive patterns of the driving electrode part, the sensing electrode part, and the wiring electrode part may be from 90% to 99.9%, but is not limited thereto.

Further, in any region of 1 mm×1 mm of the conductive patterns of the driving electrode part, the sensing electrode part, and the wiring electrode part, at least one of the regions different in aperture ratios of the conductive patterns of the driving electrode part, the sensing electrode part, and the wiring electrode part is included, and the difference in aperture ratios may be 0.1 to 5%, but is not limited thereto.

In addition, the line width of the conductive pattern of the wiring electrode part may be 150 μm or less, 100 μm or less, 50 μm or less, 30 μm or less, 10 μm or less, or 0.1 μm or more, but is not limited thereto.

In the present application, at least a part of the conductive pattern of the wiring electrode part may be different from the conductive patterns of the driving electrode part and the sensing electrode part in line width. In this case, the difference in line widths may be 5 to 100 μm, 5 to 30 μm, or 5 to 15 μm, but is not limited thereto.

In the present application, in order to form the conductive patterns of the driving electrode part, the sensing electrode part, and the wiring electrode part, conductive patterns of the driving electrode part, the sensing electrode part, and the wiring electrode part, which have a thin line width and are precise, may be formed on a transparent substrate by using a printing method. The printing method may be performed by using a method in which a paste or ink including a conductive pattern material is transferred on a transparent substrate in a desired pattern form and then fired. The printing method is not particularly limited, and a printing method such as offset printing, screen printing, gravure printing, flexo printing, inkjet printing, or nano imprint may be used, and one or more complex methods of the methods may also be used. The printing method may adopt a roll to roll method, or a roll to plate, plate to roll, or plate to plate method.

In the present application, it is preferred to apply a reverse offset printing method in order to implement the precise conductive pattern. For this purpose, in the present application, it is possible to perform a method in which ink, which may serve as a resist during etching, is coated on an entire surface of a silicone-based rubber called a blanket, an unnecessary portion is removed through an intaglio on which a pattern called a first cliché is engraved, a printing pattern remaining on the blanket is secondarily transferred on a substrate such as a film or glass on which metal and the like are deposited, and then the substrate is subjected to firing and etching processes to form a desired pattern. When this method is used, there is an advantage in that resistance in a thickness direction may be uniformly maintained as uniformity of line heights is secured over the entire region by using the substrate on which metal is deposited. In addition to this, the present application may include a direct printing method in which conductive ink such as Ag ink is directly printed by using the aforementioned reverse offset printing method and then fired to form a desired pattern. In this case, the line height of the pattern may be planarized by printing pressure applied, and conductivity may be imparted by a thermal firing process for the purpose of connecting Ag nanoparticles due to inter-surface fusion, a microwave firing process/a laser partial firing process, or the like.

In particular, when the conductive pattern of the wiring electrode part is formed by a printing process, it is preferred to perform the printing in a direction vertical to the longitudinal direction of the conductive pattern of the wiring electrode part during the printing process in order to implement a more precise conductive pattern, but the printing is not limited thereto. That is, according to an exemplary embodiment of the present application, a printing direction may be set such that for a ratio of shrinking-swelling of a film, an FPCB bonding pad may be consistently disposed in an easy direction in order to secure the dimensional stability of an FPCB bonding region. The description on the printing direction of the wiring electrode part is schematically illustrated in the following FIG. 28.

In the present application, the conductive patterns of the driving electrode part, the sensing electrode part, and the wiring electrode part may each independently further include a darkened pattern provided in a region corresponding to the conductive patterns of the driving electrode part, the sensing electrode part, and the wiring electrode part.

In the present application, a reflection-type diffraction intensity of a reflection-type diffraction image, which is obtained by irradiating light emitted from a point light source on one surface from which the darkened pattern of the touch sensing region is visible, may be reduced by 60% or more as compared to a touch sensor having the same configuration, except that the conductive pattern is formed of Al and does not include the darkened pattern. Here, the reflection-type diffraction intensity may be reduced by 60% or more, 70% or more, or 80% or more as compared to the touch sensor having the same configuration, except that the conductive pattern is formed of Al and does not include the darkened pattern. For example, the reflection-type diffraction intensity may be reduced by 60 to 70%, 70 to 80%, or 80 to 85%.

In the present application, total reflectance, which is measured by using a total reflectance measuring device with an assumption of ambient light on one surface from which the darkened pattern of the touch sensing region is visible, may be reduced by 20% or more as compared to a touch sensor having the same configuration, except that the conductive pattern is formed of Al and does not include the darkened pattern. Here, the total reflectance may be reduced by 20% or more, 25% or more, and 30% or more as compared to a touch sensor having the same configuration, except that the conductive pattern is formed of Al and does not include the darkened pattern. For example, the total reflectance may be reduced by 25 to 50%.

In the present application, the darkened pattern of the touch sensing region may be provided on the upper surface and/or the lower surface of the conductive patterns of the driving electrode part, the sensing electrode part, and the wiring electrode part, may be provided on at least a part of the side surface as well as the upper surface and the lower surface of the conductive patterns of the driving electrode part, the sensing electrode part, and the wiring electrode part, and may be provided throughout on the upper surface, the lower surface, and the side surface of the conductive patterns of the driving electrode part, the sensing electrode part, and the wiring electrode part.

In the present application, the darkened pattern of the touch sensing region may be provided on the entire surface of the conductive patterns of the driving electrode part, the sensing electrode part, and the wiring electrode part, thereby reducing visibility due to high reflectance of the conductive patterns of the driving electrode part, the sensing electrode part, and the wiring electrode part. In this case, since the darkened pattern has destructive interference and self-light absorbance under a specific thickness condition when the darkened pattern is bonded to a layer having high reflectance, such as a conductive layer, the darkened pattern exhibits an effect of reducing the reflectance by the conductive patterns of the driving electrode part, the sensing electrode part, and the wiring electrode part by similarly adjusting quantities of light reflected by the darkened pattern and light reflected by the conductive patterns of the driving electrode part, the sensing electrode part, and the wiring electrode part through the darkened pattern, and simultaneously, inducing mutual destructive interference between the two lights under the specific thickness condition.

In this case, in the color range of the pattern region formed of the darkened pattern and the conductive pattern, which are measured at the surface from which the darkened pattern of the touch sensing region according to the present application is visible, an L value may be 20 or less, an A value may be −10 to 10, and a B value may be −70 to 70, the L value may be 10 or less, the A value may be −5 to 5, and the B value may be 0 to 35, and the L value may be 5 or less, the A value may be −2 to 2, and the B value may be 0 to 15, based on a CIE LAB color coordinate.

In addition, the total reflectance of the pattern region formed of the darkened pattern and the conductive patterns of the driving electrode part, the sensing electrode part, or the wiring electrode part, which are measured at the surface from which the darkened pattern of the touch sensing region according to the present application is visible, may be 17% or less, 10% or less, or 5% or less, based on external light of 550 nm Here, the total reflectance means reflectance in consideration of both diffuse reflectance and specular reflectance. The total reflectance is a value observed by setting the reflectance of a surface opposite to the surface of which the reflectance is intended to be measured to 0 by using a black paste, a tape, and the like and then measuring only the reflectance of the surface to be measured, and in this case, a diffuse light source, which is most similar to the ambient light condition, is introduced as an incident light source. Furthermore, in this case, the measurement position of measuring the reflectance was based on a position that is inclined at about 7° from a vertical line of a hemisphere of an integrating sphere.

In the present application, the darkened pattern may be patterned simultaneously or separately with the conductive patterns of the driving electrode part, the sensing electrode part, and the wiring electrode part, but layers for forming each pattern are separately formed. However, it is most preferred to simultaneously form the conductive pattern and the darkened pattern in order to allow the conductive pattern and the darkened pattern to be present on the precisely corresponding surfaces.

By forming the pattern as described above, it is possible to implement a fine conductive pattern required for a touch sensor while an effect of the darkened pattern itself is optimized and maximized. In a touch sensor, when the fine conductive pattern fails to be implemented, physical properties required for the touch sensor, such as resistance, may not be achieved.

In the present application, the darkened pattern and the conductive patterns of the driving electrode part, the sensing electrode part, and the wiring electrode part are differentiated from a structure in which at least a part of a light absorption material is depressed or dispersed in a conductive pattern, or a structure in which a part on the surface side is physically or chemically modified due to surface treatment on a conductive layer of a single layer, in that a separate pattern layer constitutes a stacking structure.

Further, in the touch sensor according to the present application, the darkened pattern is directly provided on the substrate or directly provided on the conductive patterns of the driving electrode part, the sensing electrode part, and the wiring electrode part while an adhesion layer or adhesive layer is not interposed therebetween. The adhesion layer or the adhesive layer may affect durability or optical properties. In addition, a method for preparing a laminate included in the touch sensor according to the present application is completely different from the preparation method in which the adhesion layer or the adhesive layer is used. Furthermore, the present application is excellent in interfacial properties of a substrate or conductive patterns of a driving electrode part, a sensing electrode part, and a wiring electrode part and darkened patterns, as compared to the case of using an adhesion layer or an adhesive layer.

In the present application, any thickness may be used as long as the thickness of the darkened pattern satisfies the thickness condition of $\lambda/(4 \times n)=N$ (herein, N is an odd number) when the present application has destructive interference characteristic and absorption coefficient characteristic that are the above-described physical properties, the wavelength of light is defined as $\lambda$, and the refractive index of the darkened pattern is defined as n. However, during the preparation process, in consideration of an etching property with the conductive pattern, it is preferred that the thickness is selected from 10 nm to 400 nm, but the preferred thickness may be different according to the material and preparation process used, and the scope of the present application is not limited by the above numerical range.

The darkened pattern may be formed of a single layer, or a plurality of layers of two or more layers.

It is preferred that the darkened pattern has a color that is close to the achromatic color series. However, the darkened pattern certainly need not have an achromatic color, and even though the darkened pattern has a color, the color may be introduced when the color has low reflectance. In this case, a color of the achromatic color series means a color exhibited when light incident on a surface of an object is not selectively absorbed, and uniformly reflected and absorbed with respect to a wavelength of each component. In the present application, a material in which a standard deviation of total reflectance for each wavelength is within 50% may be used in the darkened pattern when the total reflectance is measured in a visible ray region (400 nm to 800 nm).

The material for the darkened pattern is a light absorbing material, and may be used without particular limitation as long as the material is preferably formed of metal, metal oxide, metal nitride or metal oxynitride having the above-described physical properties when the entire surface layer is formed.

For example, the darkened pattern may be an oxide film, a nitride film, an oxide-nitride film, a carbide film, a metal film or a combination thereof, which is formed by using Ni, Mo, Ti, Cr, and the like under a deposition condition set by the person skilled in the art.

As a specific example thereof, the darkened pattern may include both Ni and Mo. The darkened pattern may include 50 to 98 atom % of Ni and 2 to 50 atom % of Mo, and may further include 0.01 to 10 atom % of other metals, for example, atoms such as Fe, Ta, and Ti. Here, the darkened pattern may further include 0.01 to 30 atom % of nitrogen or 4 atom % or less of oxygen and carbon, if necessary.

As another specific example, the darkened pattern may include a dielectric material selected from SiO, $SiO_2$, $MgF_2$, and $SiN_x$ (x is an integer of 1 or more) and a metal selected from Fe, Co, Ti, V, Al, Cu, Au, and Ag, and may further include an alloy of two or more kinds of metals selected from Fe, Co, Ti, V, Al, Cu, Au, and Ag. It is preferred that the dielectric material is distributed so as to be gradually decreased as the dielectric material becomes far away from an incident direction of external light, and the metal and the alloy components are distributed in a converse direction. In this case, it is preferred that the content of the dielectric material is 20 to 50 wt % and the content of the metal is 50 to 80 wt %. When the darkened pattern further includes the alloy, it is preferred that the darkened pattern includes 10 to 30 wt % of the dielectric material, 50 to 80 wt % of the metal, and 5 to 40 wt % of the alloy.

As another specific example, the darkened pattern may be formed of a thin film including an alloy of nickel and vanadium, and one or more of oxide, nitride, or oxynitride of nickel and vanadium. In this case, it is preferred that vanadium is included in an amount of 26 to 52 atom %, and it is preferred that an atomic ratio of vanadium to nickel is 26/74 to 52/48.

As another specific example, the darkened pattern may include a transition layer including two or more elements, in which a composition ratio of one element is increased by maximally about 20% per 100 angstrom according to an incident direction of external light. In this case, one element may be a metal element such as chromium, tungsten, tantalum, titanium, iron, nickel or molybdenum, and an element other than the metal element may be oxygen, nitrogen or carbon.

As another specific example, the darkened pattern may include a first chromium oxide layer, a metal layer, a second chromium oxide layer, and a chromium mirror, and in this case, may include metal selected from tungsten, vanadium, iron, chromium, molybdenum, and niobium instead of chromium. The metal layer may have a thickness of 10 to 30 nm, the first chromium oxide layer may have a thickness of 35 to 41 nm, and the second chromium oxide layer may have a thickness of 37 to 42 nm As another specific example, a stacking structure of an alumina ($Al_2O_3$) layer, a chromium oxide ($Cr_2O_3$) layer and a chromium (Cr) layer may be used as the darkened pattern. Here, the alumina layer may have improvement of reflection characteristics and light diffusion prevention characteristics, and the chromium oxide layer may enhance contrast characteristics by decreasing the specular reflectance.

In the present application, the darkened pattern is provided in a region corresponding to the conductive patterns of the driving electrode part, the sensing electrode part, and the wiring electrode part. Here, the region corresponding to the conductive pattern means that the region has a pattern having the same shape as the conductive pattern. However, the pattern scale of the darkened pattern need not be completely the same as that of the conductive pattern, and the case where the line width of the darkened pattern is narrower or wider than the line width of the conductive pattern is also encompassed in the scope of the present application. For example, it is preferred that the darkened pattern has an area of 80% to 120% of an area in which the conductive pattern is provided.

It is preferred that the darkened pattern has a pattern shape having a line width equal to or larger than the line width of the conductive pattern.

When the darkened pattern has a pattern shape having a line width which is larger than the line width of the conductive pattern, the darkened pattern may more greatly impart an effect that the darkened pattern shields the conductive pattern when observed by a user, and thus is advantageous in that the darkened pattern may efficiently block an effect caused by luster or reflection of the conductive pattern itself. However, even when the line width of the darkened pattern is the same as that of the conductive pattern, an effect to be targeted by the present application may be achieved. It is preferred that the line width of the darkened pattern is larger than that of the conductive pattern by a value according to the following Equation 2.

$$T_{con} \times \tangent \Theta_3 \times 2 \qquad \text{[Equation 2]}$$

In Equation 2, $T_{con}$ is a thickness of a conductive pattern, and $\Theta_3$ is an angle between light and a tangential line with respect to the surface of the substrate when light, which is incident from a position at which the angle of vision of the user of a touch sensor is located, passes through the corners of the conductive pattern and the darkened pattern.

$\Theta_3$ is an angle obtained by modifying an angle ($\Theta_1$) between the angle of vision of the user of the touch sensor and the substrate according to the Snell's law by a refractive index of the substrate and a refractive index of a medium of a region in which the darkened pattern and the conductive pattern are disposed, for example, an adhesive of the touch sensor.

As an example, assuming that an observer observes the laminate such that the value of $\Theta_3$ forms an angle of about 80° and the thickness of the conductive pattern is about 200 nm, it is preferred that the line width of the darkened pattern is larger than that of the conductive pattern by about 2.24 μm (200 nm×tan(80)×2) based on the lateral surface. However, as previously described, even when the darkened pattern has the same line width as that of the conductive pattern, an effect to be targeted by the present application may be achieved.

According to an exemplary embodiment of the present application, it is possible to reduce a cost of preparing a touch sensor and make the touch sensor lighter and thinner by improving a process of preparing the touch sensor.

According to an exemplary embodiment of the present application, a thickness of the touch sensor may be minimized because a single-sided one-sheet type touch sensor may be provided, and a method for preparing the same is easy because all the conductive patterns are formed on a single side. In addition, the touch sensor is a one-sheet type, and thus is advantageous in that the touch sensor need not be laminated when compared to that in the related art, which is formed using two or more substrates. Furthermore, since the driving electrode part and the sensing electrode part are disposed on the same surface, it is easy to install and attach a flexible printed circuit board (FPCB). Further, since the touch sensor is a one-sheet type, the light transmittance is excellent as compared to a two-sheet type touch sensor. In addition, when a functional surface film is laminated on the surface of the touch sensor, the step difference is not large, so that there is an advantage in that bubbles are not filled.

According to an exemplary embodiment of the present application, it is possible to reduce a cost of preparing a touch sensor and make the touch sensor lighter and thinner by improving a process of preparing the touch sensor.

The invention claimed is:

1. A touch sensor comprising:
   a substrate; and
   a driving electrode part, a sensing electrode part, and a wiring electrode part, which are provided on the same surface of the substrate,
   wherein the driving electrode part comprises a first conductive metal line pattern, the sensing electrode part comprises a second conductive metal line pattern, and the wiring electrode part comprises a third conductive metal line pattern, wherein each of the driving electrode part, the sensing electrode part and the wiring electrode part comprises a shielding part, which is not optically transparent and in which a conductive metal line is provided on the substrate, and an opening in which the conductive metal line is not provided on the substrate, wherein at least a part of the first conductive metal line pattern of the driving electrode part and the second conductive metal line pattern of the sensing electrode part each comprises a plurality of disconnection points where the respective conductive metal line pattern of the driving electrode part and the sensing electrode part is disconnected from adjacent conductive metal line patterns on the substrate such that an electrical connection is interrupted between the respective conductive metal line patterns of the driving electrode part and the sensing electrode part and the adjacent conductive metal line patterns on the substrate, and each disconnection point establishes a distance between nearest adjacent ends of two or more conductive metal lines that has an average width of 13 um or less, the wiring electrode part comprises a first portion disposed at a touch sensing region of the touch sensor and a second portion disposed at a touch non-sensing region of the touch sensor, and the first portion of the wiring electrode part comprises a plurality of bundles of wirings which connect the driving electrode part and the sensing electrode part to the second portion of the wiring electrode part, wherein each of the plurality of bundles of wirings is composed of a network pattern comprising a plurality of conductive metal wirings arranged in one of a regular mesh pattern and a polygonal pattern, wherein from among the plurality of bundles of conductive metal wirings at least one bundle of wirings comprises a largest number of conductive metal wirings among the plurality of bundles, and for the at least one bundle of conductive metal wirings comprising the largest number of conductive metal wirings, a width (W) of the at least one bundle, the number (n) of the conductive metal wirings included in the at least one bundle, and a minimum value (P) among respective distances between center points of adjacent network structures of the network pattern of the at least one bundle sharing at least one side in the network pattern constituting the at least one bundle of conductive metal wirings are implemented according to Equation 1:

$$\frac{W}{n} \times \sqrt{2} \geq P, \qquad \text{[Equation 1]}$$

wherein the driving electrode part comprises a pattern of X form and the sensing electrode part comprises a pattern surrounding the pattern of X form, and wherein the respective distances between center points of adjacent network structures of the network pattern of the at least one bundle sharing at least one side in the network pattern constituting the at least one bundle of conductive metal wirings corresponds to a pitch of a mesh pattern when the network pattern is the regular mesh pattern, and corresponds to a distance between center points of adjacent polygonal patterns sharing at least one side or a distance between centers of gravity when the network pattern is the polygonal pattern.

2. The touch sensor of claim 1, wherein at least one of the plurality of bundles of conductive metal wirings satisfies Equation 2:

$$\frac{W}{n} \geq P \times \cos\theta 1, \quad \text{[Equation 2]}$$

wherein W, n, and P are the same as those defined in Equation 1, and

θ1 represents an angle between a straight line connecting a shortest distance in a width direction of the at least one bundle of conductive metal wirings that satisfies Equation 2 and a straight line connecting center points of adjacent network structures of the network pattern of the at least one bundle of conductive metal wirings that satisfies Equation 2 sharing at least one side in the network pattern constituting the at least one bundle of conductive metal wirings that satisfies Equation 2 as the shortest distance.

3. The touch sensor of claim 1, wherein at least one of the plurality of bundles of wirings is composed of a form of pattern in which closed figures having two disconnection points are consecutively disposed in a direction from one side of the substrate, which is adjacent to an end of the second wiring electrode, to the other side of the substrate facing the one side, a shortest distance between adjacent disconnection points of the consecutively disposed closed figures includes one or more inflection points having an angle of 90° or more, and a pattern tangent to the shortest distance between adjacent disconnection points electrically connects the driving electrode part or the sensing electrode part to the second portion of the wiring electrode part.

4. The touch sensor of claim 3, wherein at least one of the plurality of bundles of conductive metal wirings satisfies Equation 3:

$$\frac{W}{n} \geq P \times \cos\theta 2, \quad \text{[Equation 3]}$$

wherein W, n, and P are the same as those defined in Equation 1, and

θ2 represents an angle between a straight line in a direction vertical to a shortest distance between disconnection points of consecutively disposed closed figures in the at least one bundle of conductive metal wirings that satisfies Equation 3, and a straight line connecting center points of adjacent network structures sharing at least one side in the network pattern constituting the at least one bundle of conductive metal wirings that satisfies Equation 3 as the shortest distance.

5. The touch sensor of claim 1, wherein the conductive metal line comprises one or more selected from the group consisting of gold, silver, aluminum, copper, neodymium, molybdenum, nickel, and an alloy thereof.

6. The touch sensor of claim 1, wherein the respective conductive metal line patterns of the driving electrode part, the sensing electrode part, and the wiring electrode part each independently further comprise a darkened pattern provided on the respective conductive metal line patterns.

7. The touch sensor of claim 1, wherein each disconnection point is provided in an intersecting point region in which the conductive metal lines in the driving electrode part or the sensing electrode part intersect with each other.

8. The touch sensor of claim 1, wherein a deviation in the aperture ratios among any regions of the touch sensor corresponding to the area of (W ×W) is within 10%, where W is the width of the at least one bundle of wirings.

9. The touch sensor of claim 1, wherein the driving electrode part, the sensing electrode part, and the wiring electrode part are simultaneously formed by a one-time printing process.

10. The touch sensor of claim 1, wherein the touch sensor recognizes a touch input using a mutual capacitance system.

11. A display device comprising the touch sensor of claim 1.

* * * * *